(12) United States Patent
Pearson et al.

(10) Patent No.: US 7,344,582 B2
(45) Date of Patent: Mar. 18, 2008

(54) FILTER ASSEMBLY

(75) Inventors: John Pearson, Chester-Le-Street (GB); Thomas Stephen Bittle, Newcaslte Upon Tyne (GB); Raymond Francis Trowsdale, Consett (GB); Brian Lane, Hebburn (GB)

(73) Assignee: Parker Hannifin Limited, Hemel Hempstead (GB)

( * ) Notice: Subject to any disclaimer, the term of this patent is extended or adjusted under 35 U.S.C. 154(b) by 0 days.

(21) Appl. No.: 11/626,862

(22) Filed: Jan. 25, 2007

(65) Prior Publication Data

US 2007/0186524 A1 Aug. 16, 2007

Related U.S. Application Data

(63) Continuation of application No. PCT/GB2005/002908, filed on Jul. 26, 2005.

(30) Foreign Application Priority Data

Aug. 5, 2004 (GB) ................................. 0417463.7
Dec. 31, 2004 (GB) ................................. 0428567.2

(51) Int. Cl.
*B01D 46/00* (2006.01)
(52) U.S. Cl. ............................. 55/504; 55/486; 55/498; 55/502; 210/232; 210/444; 210/454
(58) Field of Classification Search .................. 55/498, 55/502, 504, 505, 482, 485–487, DIG. 17, 55/DIG. 25; 210/DIG. 5
See application file for complete search history.

(56) References Cited

U.S. PATENT DOCUMENTS 2,096,851 A * 10/1937 Fricke .......................... 96/132
3,772,857 A * 11/1973 Jackson et al. ............... 55/418
3,901,262 A 8/1975 Gutkowski (Continued)

FOREIGN PATENT DOCUMENTS

GB 2 295 970 A1 6/1996
WO 9930803 6/1999

OTHER PUBLICATIONS

International Search Report in corresponding International Application No. PCT/GB05/002908.
Search Report under Section 17 in corresponding Great Britain Patent Application No. GB0417463.7.

*Primary Examiner*—Duane Smith
*Assistant Examiner*—Robert A Clemente
(74) *Attorney, Agent, or Firm*—Christopher H. Hunter

(57) ABSTRACT

This invention relates to a filter assembly for removing material that is entrained in a gas stream. The filter assembly comprises a housing which comprises head and body parts, with an inlet port in the head part for a gas stream to flow into the housing, the head and body parts having formations which enable them to be connected to one another and separated by relative rotation. The filter assembly further comprises a filter element which can be fitted within the housing. The filter element comprises a wall of a filtration medium which defines a hollow space for a gas stream to flow from the space through the wall to be filtered, and an end cap with an inlet which can be sealed to the inlet port in the head part of the housing to provide a flow path for a gas stream to be supplied from the inlet port in the housing to the said space. The filter element fits into the body part of the housing, and the end cap and the body part have interengaging formations in the form of at least one rib and at least one groove, arranged so that the rib can be slid into the groove when the filter element is fitted into the body part, and so that the filter element rotates with the body part relative to the head part.

28 Claims, 10 Drawing Sheets

U.S. PATENT DOCUMENTS

| | | |
|---|---|---|
| 4,105,561 A | 8/1978 | Domnick |
| 4,336,043 A * | 6/1982 | Aonuma et al. ............... 55/483 |
| 5,145,494 A * | 9/1992 | Sowinski ..................... 95/142 |
| 5,186,829 A | 2/1993 | Janik |
| 5,632,793 A * | 5/1997 | Haggard ...................... 55/498 |
| 5,685,985 A * | 11/1997 | Brown et al. ................ 210/450 |
| 5,961,678 A * | 10/1999 | Pruette et al. ................ 55/485 |
| 6,391,197 B1 * | 5/2002 | Billiet ........................ 210/232 |
| 6,409,786 B1 * | 6/2002 | Wright et al. .................. 55/507 |
| 6,416,563 B1 * | 7/2002 | Wright et al. .................. 55/513 |
| 6,461,397 B1 * | 10/2002 | Billiet ........................ 55/498 |
| 6,506,302 B2 | 1/2003 | Janik |
| 6,852,148 B2 * | 2/2005 | Gieseke et al. ............... 95/287 |
| 2002/0189216 A1 | 12/2002 | Wright et al. |
| 2004/0035094 A1 * | 2/2004 | Jersey ......................... 55/478 |
| 2004/0035097 A1 | 2/2004 | Schlensker et al. |

* cited by examiner

FILTER ASSEMBLY

CROSS REFERENCE TO RELATED APPLICATIONS

This application is continuation of copending International Application No. PCT/GB05/002908 filed Jul. 26, 2005, which designated the United States, the disclosure of which is incorporated herein by reference, and which claims priority to Great Britain Patent Application Nos. 0428567.2, filed Dec. 31, 2004; and 0417463.7, filed. Aug. 5, 2004.

BACKGROUND OF THE INVENTION

This invention relates to a filter assembly for removing material that is entrained in a gas stream.

SUMMARY OF THE INVENTION

Filtration of gas in a compressed gas system is generally required so that the gas is sufficiently free of contaminants (liquid, solid or gaseous) for a subsequent application or to minimize adverse effects of contaminants on components of the system. For example, removal of compressor oil can be required to minimize chemical contamination and accumulation on valves which might lead to malfunction of the valves. It is known to treat a gas stream to remove contaminants (liquid, solid or gaseous) by filtering the gas stream. A filter element used for such filtration has a limited lifetime: accumulation of contaminants with prolonged use gives rise to unacceptable pressure drop, and can also lead to reentrainment of the contaminants in the gas stream. It is therefore necessary to replace the filter element from time to time.

PCT Application No. WO-A-02/38247 discloses a filter assembly which comprises a housing comprising head and body parts, and a filter element which can be fitted within the housing. The filter element comprises a wall of a filtration medium and has an end cap with an inlet which can be sealed to the head part of the housing to provide a flow path for a gas stream to be supplied to the space within the filter element. The inlet is provided by a flow conduit on an end cap of the element. The flow conduit has an O-ring seal on its external surface which is received in a bore within the housing end cap, in which is compressed to form a seal.

The filter element is assembled in the housing by locating the flow conduit on the element end cap in the bore in the housing head part. The O-ring seal is compressed as a result of this, so that a seal is formed between the bore in the housing head part and the element. The head and body parts of the housing are then connected together by means of cooperating screw threads.

The head and body parts of the housing are separated in order to gain access to the filter element when it has to be replaced. The frictional engagement between the O-ring seal and each of the bore in the housing head part and the flow conduit on the element end cap means that the filter element remains attached to the housing head part when the housing body part is removed. This effect in a compressed O-ring seal is sometimes referred to as "friction". The element has to be gripped in order to separate it from the housing head part. This involves gripping the filtration medium which will often be loaded with collected oil and other impurities.

The present invention provides a filter assembly in which the end cap on the filter element and the body part of the housing have interengaging formations in the form of at least one rib and at least one groove, arranged so that the rib can be slid into the groove when the filter element is fitted into the body part, and so that the filter element rotates with the body part relative to the head part.

Accordingly, in one aspect, the invention provides a filter assembly for removing material that is entrained in a gas stream, which comprises:

a. a housing which comprises head and body parts, with an inlet port in the head part for a gas stream to flow into the housing, the head and body parts having formations which enable them to be connected to one another and separated by relative rotation, b. a filter element which can be fitted within the housing, comprising a wall of a filtration medium which defines a hollow space for a gas stream to flow from the space through the wall to be filtered, and an end cap with an inlet which can be sealed to the inlet port in the head part of the housing to provide a flow path for a gas stream to be supplied from the inlet port in the housing to the said space, in which the filter element fits into the body part of the housing, and in which the end cap and the body part have interengaging formations in the form of at least one rib and at least one groove, arranged so that the rib can be slid into the groove when the filter element is fitted into the body part, and so that the filter element rotates with the body part relative to the head part.

In another aspect, the invention provides a tubular filter element for collecting material that is entrained in a gas stream, which has a wall of a filtration medium which defines a hollow space within it so that a gas stream can flow through the wall to be filtered, the element including an end cap with an inlet for a gas stream to be supplied to the space within the wall, in which the end cap has a formation in the form of at least one rib, arranged so that the rib can be slid into a groove provided in a body part of a filter assembly when the filter element is fitted into the body part, and so that the filter element rotates with the body part relative to the head part. Features of the filter element of this aspect of the invention are common to the filter element which forms part of the assembly of the invention.

The assembly of the invention has the advantage that the filter element can be loosened from the housing head part when the housing body part is rotated relative to the housing head part. This can overcome any frictional engagement between the filter element and the housing head part, for example between an O-ring seal and each of a bore in the housing head part and a flow conduit on the element end cap between which it is compressed. Accordingly, the filter element can be removed from the housing head part together with the housing body part, without having to touch the filter element directly. This has advantages for the operator in that the filter element will generally be loaded with collected oil and other impurities which will be retained within the housing throughout the procedure of opening the housing.

Preferably, the rib is provided on the end cap of the filter element and the groove into which the rib can slide is provided on the body part of the housing. Forming a part by molding can be easier when the part has a rib formed on it compared with when the part has a groove formed on it.

Preferably, the rib is approximately planar and arranged so that the angle between the plane of the rib and the axis of the assembly is not more than about 15°, more preferably not more than about 10°, especially not more than about 5°. It is especially preferred that the plane of the rib is parallel to, for example contains, the axis of the assembly.

Preferably, at least one of the rib and the groove is tapered so that the security of the engagement of the rib in the groove against rotation of the filter element relative to the housing base part is increased by increasing the depth to which the rib is received in the groove. Preferably, each of the rib and the groove are tapered so that the rib is guided into the groove and so that, when the element is properly received in the body part of the housing, the rib fits snugly into the groove. The provision of a taper on at least one of the rib and the groove, preferably both, has the advantage of facilitating assembly of the element in the housing, while also providing a snug fit to resist relative rotation after assembly.

A further advantage of the provision of a taper on the rib is that it can reduce the resistance to flow of gas over its surfaces. This can be an advantage when the rib is provided in the path for a gas which has passed through the filtration medium and is flowing to an outlet in the housing through which the gas is supplied to a downstream application.

Preferably, the leading edge of the rib (which is directed towards the gas stream) is rounded and the trailing edge of the rib is tapered inwardly towards (optionally to) a sharp edge or point. The rib can be approximately aerofoil-shaped when viewed in cross-section (perpendicular to the axis of the assembly). The rib can be arranged within the assembly so that it causes a change in the direction of flow of gas which flows over it, towards the gas outlet from the assembly. For example, if the gas outlet is provided in the back face of the assembly, ribs on the sides of the assembly can be inclined to the axis of the assembly so that a gas stream flowing over the ribs is directed towards the outlet in the back face. Such a rib can be planar and inclined to the axis, towards the outlet. Such a rib can be curved towards the outlet.

The rib can flare outwardly from its leading edge (which is directed towards the gas stream) towards the trailing edge, in order to direct the flow of the gas stream past an obstruction between the rib and the gas outlet from the assembly. A flared rib can usefully direct the flow of the gas stream past an obstruction such as an inlet conduit in the housing head part. For example, the rib can be approximately V-shaped when viewed in cross-section, perpendicular to the axis of the assembly.

Preferably, a V-shaped rib has an approximately flat top surface extending between the open ends of the "V", thereby giving the rib an approximately triangular shape when viewed in cross-section, perpendicular to the axis of the assembly. Preferably, the flat top surface extends perpendicularly to the axis of the filter assembly. A V-shaped rib having a flat top surface can be advantageous as the top surface can provide high torsional strength against the rotational drive applied to the filter element as it attempts to rotate within the body of the assembly. Rotational drive is applied to the filter element by the head of the assembly as it is rotated relative to the body, due to the friction forces between the filter element and the head of the assembly. In contrast, a generally planar rib that extends parallel to the axis of rotation is relatively weak and therefore cannot provide as strong a force to oppose the rotation of the filter element with the head of the assembly.

At least two ribs and at least two corresponding grooves can be provided. At least three ribs and grooves can be provided, for example four ribs and grooves. This can provide for more secure engagement between the element and the housing. However, forming grooves within the housing body can increase the complexity of manufacturing the body. Therefore, there need not be a corresponding groove for each rib. For example, there can be at least two ribs and only one corresponding groove for one of the ribs. Preferably, there are at least four ribs and corresponding grooves for two of the ribs. However, there can be any number of ribs and corresponding grooves, provided that there is at least one corresponding rib and groove. When there are more ribs than grooves, preferably the axial face for each rib for which there is no corresponding groove matches the profile of the inside of the housing or element against which the rib will rest. Such a rib will not provide any opposition to the torsional forces applied to the filter element, but can help support and locate the filter element axially within the housing.

Preferably, when there is more than one rib, the ribs are spaced apart approximately equally around the assembly; for example when the assembly is approximately circular in cross-section and there are three ribs, they are preferably spaced apart about 120° around the periphery of the element or housing, and when there are four ribs, they are preferably spaced apart about 90° around the element or housing.

When there are more ribs than grooves, preferably the grooves are spaced apart approximately equally around the assembly; for example when the assembly is approximately circular in cross-section and there are four ribs and only two corresponding grooves, the grooves are preferably spaced apart 180° around the periphery of the housing.

When there is more than one rib, each rib does not need to be the same. For example, when there are two ribs, one rib may be approximately planar, and the other V-shaped. When there are four ribs, preferably, two ribs are V-shaped and two ribs are approximately planar. More preferably, the two V-shaped ribs are spaced apart about 180° around the periphery of the element or housing relative to each other, and the two approximately planar ribs are spaced apart about 180° around the periphery of the element or housing relative to each other. However, any number and any combination of ribs can be provided. For example, when there are four ribs, only one rib can be V-shaped, and three ribs can be approximately planar. Preferably, when there is at least one V-shaped, the V-shaped rib is located under the inlet port in the head of the assembly when the filter assembly is assembled.

Preferably, the filter element can only be fully received within the housing in one orientation. This can help ensure that the element is inserted correctly as it will not be possible to assemble the filter assembly unless the element is fully received within the housing. This can be achieved by providing a combination of ribs and corresponding grooves which only fit together when the filter element is correctly orientated. For example, when there is only one rib and one groove, there is only one orientation in which the filter element can be received within the housing (i.e. when the rib and groove are aligned). When there are at least two ribs each having a corresponding groove, preferably each rib and corresponding groove are shaped and/or sized so that each rib can only be received by its corresponding groove. For example, where there are four equally spaced ribs, two of which are V-shaped and have equally spaced corresponding grooves spaced, preferably the widths of the V-shaped ribs and corresponding grooves are different to each other, thereby ensuring that the V-shaped ribs can only be received by their corresponding groove.

A flow conduit having a first conduit opening for communication with a port (generally the inlet port in the housing head) for the gas that is to be filtered and a second conduit opening for communication with the inlet on the end cap, can be provided. Generally, the flow of the gas stream towards and away from the assembly will be horizontal. The filter element will generally be arranged vertically so that the housing head is at the top of the housing with the filter element located depending below it. In such constructions, the axis of the first conduit opening and the axis of the second conduit opening will not be aligned. Generally, the axis of the first conduit opening will be substantially perpendicular to the axis of the second conduit opening.

Preferably, the flow conduit will be configured to provide a smooth flow path for a gas which flows between the first and second conduit openings. The smooth flow path can be constructed to reduce restriction of the flow of the gas stream compared for example with a flow conduit which presents a discontinuous flow path which is sharply angled or contains steps or other obstructions.

The flow conduit can be provided as part of the end cap. However, preferably the flow conduit is formed separately from the end cap and subsequently fastened to the end cap. This can reduce the costs of manufacturing the end cap, especially when the end cap and flow conduit and formed by a molding process. The interface between the inlet in the filter element and the flow conduit should form a fluid tight seal to ensure that all gas that flows through the flow conduit enters the filter element. Preferably, the flow conduit and the end cap are formed form the same material. Preferably, the flow conduit can be fastened to the end cap so that it can be subsequently removed. For example, preferably the flow conduit is fastened to the end cap through the use of a mechanical fastening such as a latch, co-operating screw threads, or engaging bayonet formations. More preferably, the flow conduit and the inlet in the end cap are shaped and sized so that the flow conduit is held within the end cap by the friction forces between the flow conduit and the end cap.

Preferably, the flow conduit extends into the head part of the housing when the assembly is assembled. A seal can be provided in one or both of the surfaces of the housing and the flow conduit which contact one another. For example, a seal can be provided in a face of the flow conduit around the first conduit opening. The seal can be provided in a groove in that face. It can be provided as a separable component of the flow conduit. It might be formed as an integral part of the flow conduit, for example as a result of being formed by molding in place. The material for seals in an assembly according to the invention will be selected according to the application for the assembly; the seal will generally be provided by an elastomeric material.

The head part can present a bore in which the end of the flow conduit is received. Preferably, the head part of the housing has internal walls which define a primary chamber within it which communicates with one of the ports and also with the hollow space within the tubular filter element. Generally, the axis of the port and the axis of the tubular filter element will not be aligned. Preferably, a seal is provided between the internal wall of the primary chamber at or towards the free end thereof and the flow conduit at the second conduit opening thereof. Preferably, the flow conduit extends from the hollow space into the primary chamber. It has been found the provision of a flow conduit that extends from the hollow space into the primary chamber can give rise to significant advantages, including that any turbulence in the flow of gas within the chamber between the port and the hollow space resulting from the non-alignment of the axes can be reduced. Further, such an assembly has fewer constraints on the design of the head part with a view to minimising flow resistance compared with other assemblies, such as that disclosed in PCT Application No. WO-02/38247. Details of a filter assembly having a primary chamber into which the flow conduit extends are disclosed in the co-pending PCT application filed with the present application which claims priority from UK Patent Application No. 0417458.7. Subject matter that is disclosed in that application is incorporated in the specification of the present application by this reference.

The flow conduit can be made with additional features during its manufacture. For example, a port might be formed in it for connection to means for indicating the pressure within the conduit. Such ports are known, for example as disclosed in PCT Application No. WO-A-99/30798. Details of an alternative arrangement for such a port are disclosed in the co-pending PCT application filed with the present application which claims priority from UK Patent Application No. 0417458.7. Subject matter that is disclosed in that application is incorporated in the specification of the present application by this reference.

The flow conduit can contain at least one vane positioned within it so that the flow of gas along the conduit between the first and second conduit openings passes over the vane and is smoothed by it. The provision of a vane in the flow conduit has been found to reduce the resistance to flow of gas through the flow conduit compared with a flow conduit which does not include a vane. This can enable the efficiency of a filter element to be enhanced compared with known assemblies of this general kind. Details of a filter assembly having a flow conduit which has a vane are disclosed in the co-pending PCT application filed with the present application which claims priority from UK Patent Application No. 0417464.5. Subject matter that is disclosed in that application is incorporated in the specification of the present application by this reference.

Preferably, the flow conduit contains at least two of the said vanes.

The flow conduit can be formed in first and second matable pieces, in which the first piece comprises a first part of the flow conduit wall and the vane, and the second piece comprises a second part of the flow conduit wall which has a recess formed in it in which the end of the vane that is remote from the first part of the conduit wall can be received when the first and second pieces are mated. Preferably, the first and second matable pieces of the flow conduit mate in a plane which contains the first and second conduit openings. Details of a filter assembly in which the flow conduit can be formed in first and second matable pieces are disclosed in the co-pending PCT application filed with the present application which claims priority from UK Patent Application No. 0417464.5. Subject matter that is disclosed in that application is incorporated in the specification of the present application by this reference.

The end cap can include an inlet tube extending from the inlet in the end cap into the hollow space defined by the wall of the filter element. The inlet tube can aid the even distribution of gas through the wall of the filter element. Preferably the inlet and the inlet tube are co-axial with the end cap, however, it will be appreciated that this need not be the case.

Preferably, the tube is approximately straight, at least in the portion of its length that is within the hollow space. Preferably the ratio of the length of the tube (measured from the inner surface of the end cap on which the tube is mounted) to the length of the filter element (measured between the inner surface of the opposite end caps) is at least about 0.15, more preferably at least about 0.20, especially at least about 0.25.

The end cap can have an opening extending around the periphery of the inlet tube for supply of the gas stream to the element wall close to the end cap. This can be advantageous as it can aid the even distribution of contaminant material across the element wall.

The inlet tube can be formed integrally with the end cap, or can be formed separately and subsequently fastened to the end cap.

It can be advantageous to form the inlet tube separately as it allows the for the production of a variety of different inlet tubes that can be fastened to standard end caps. However, it can also be advantageous to form the end cap and the inlet tube as one piece as this can reduce manufacturing costs. This can especially be the case if a variety of different inlet tubes are not used in different applications.

If the inlet tube is formed separately from the end cap, then the interface between the end cap and the inlet tube should form a fluid tight seal. Preferably, the tube and the end cap are formed form the same material. Preferably, the inlet tube can be fastened to the end cap so that it can be subsequently removed. For example, preferably the inlet tube is fastened to the end cap through the use of a mechanical fastening such as a latch, co-operating screw threads, or engaging bayonet formations. More preferably, the inlet tube and the end cap are shaped and sized so that the inlet tube is held within the end cap by the friction forces between the inlet tube and the end cap.

It can be advantageous in some applications to fasten the inlet tube to the end cap so that the inlet tube cannot be subsequently removed from the end cap. In this case, preferably the inlet tube is fastened to the end cap without the use of a third party material. For example, preferably, the inlet port is fastened to the end cap through the use of a welding technique, for example, ultrasonic or heat welding. However, it will be appreciated that the inlet port can be fastened to the end cap through the use of a third party material such a bonding agent, for example an adhesive.

The inlet tube can have at least one helically extending rifle formation in its internal wall by which a helical flow is imparted to the gas stream when it leaves the tube. This can facilitate a more even distribution of contaminant material in the gas stream over the length of the filter element. Furthermore, primary separation of liquid droplets from the gas stream can be facilitated as a result of the helical flow of gas entering the element. Details of a filter element having an inlet tube with at least one helically extending rifle formation in its internal wall are disclosed in the co-pending PCT application filed with the present application which claims priority from UK Patent Application No. 0417457.9. Subject matter that is disclosed in that application is incorporated in the specification of the present application by this reference.

The inlet tube can have at least one opening in its side wall. Preferably, the inlet tube has an upstream band, a middlestream band and a downstream band, the said bands being axially adjacent to one another and non-overlapping, having equal axial lengths of at least 5% of the length of the inlet tube, and being arranged such their planes are perpendicular to the axis of the inlet tube, and in which the proportion of the area of the side wall that is open in the upstream band is smaller than that in the middlestream band, and the proportion of the area of the side wall that is open in the middlestream band is smaller than that in the downstream band. This can help ensure that the supply of gas into the filter element is graded, which can lead to a more even distribution of gas flowing through the element wall. Details of a filter element having an inlet tube with at least one opening in its side wall are disclosed in the co-pending PCT application filed with the present application which claims priority from UK Patent Application No. 0417462.9. Subject matter that is disclosed in that application is incorporated in the specification of the present application by this reference.

Materials suitable for use in a filtration filter element will be selected according to the nature of the gas that is being filtered, the nature of the contaminants (gases, liquid droplets, aerosols, solid particles etc) to be removed from the gas, the pressure differential across the filter and so on. Suitable materials are known. For example, in relation to the removal of contaminants in the form of aerosol droplets (especially of compressor oil), suitable filter materials include those used by Domnick Hunter Limited in products which are available under the trade mark OIL-X, which might for example include borosilicate and other glass fibers, activated carbon minerals, activated silica materials and so on. A filtration layer can be made from woven fibers. However, as will be appreciated, a filtration layer can be made from sheets of non-woven fibers. For example, a microfibre filtration layer made from fine organic or inorganic fibers is preferred. Preferably, a coarser fibre layer is fitted on the inside of a microfibre filtration layer. This coarser layer can protect a microfibre filtration layer from gross pollution.

When the assembly is used to remove gaseous contaminants from a gas stream (for example in a stream of a process gas, for example carbon dioxide or nitrogen), the filter medium in the filter element should be selected so that it has an affinity for the contaminants that are present. Examples of contaminants which might be present in a gas stream might include acetaldehyde, ammonia, benzene, carbon disulphide, carbon monoxide, carbonyl sulphide, cyclohexane, dimethyl ether, dimethyl sulphide, ethane, ethanol, ethyl benzene, hydrogen sulphide, methane, methyl mercaptan, nitrogen oxides, phosphine, propyl alcohol, propyl mercaptan, sulphur dioxide and xylene. Absorbent materials which can be used to remove such contaminants might be selected from, for example, activated carbons, zeolites, aluminas, carbon molecular sieves and so on. The selection of a suitable absorbent material can be made with reference to standard reference works.

Preferably, the filtration layer can comprise a layer of a material which has been folded so that it is fluted (or pleated). This can increase the surface area of the filtration layer through which air flowing through the filter element will pass. This can also help to increase the rigidity of the filtration layer.

The filtration layer can be surrounded by an "anti-reentrainment" or drainage layer on its outside. Drainage layers are especially used in filter elements where the nature of the contaminants to be filtered from the gas is in the form of aerosols, or liquid droplets. The drainage of filter element can be any material that is capable of retaining liquid that has been coalesced by the filtration layer, and is carried to the drainage layer by a gas stream that flows through the drainage layer. The drainage layer of the filter element will generally be porous, and made from a material which encourages flow of coalesced liquid towards the base of the filter element. Factors affecting the drainage characteristics include pore size and structure, and the material of the drainage layer, including for example the surface energy of liquid which is in contact with the material. Materials suitable for use in the drainage layer are used in similar products sold by Domnick Hunter Limited under the trade mark OIL-X. Suitable materials include open-celled foam plastics, felted fabric material, and expanded foam materials.

When the assembly of the invention is intended for the treatment of a gas stream which does not contain liquid (including liquids in aerosol form), for example containing just gaseous contaminants, the drainage layer component can be omitted.

The element can include at least one support for the filtration layer. This can help to retain the filtration layer in its position within the filter element. This can also increase the rigidity of the filter element. A support can be provided within the hollow space, positioned against the internal surface of the filtration layer. A support can be positioned outside the filtration layer, for example between the filtration layer and the drainage layer (when present). Preferably, a first support made of a rigid material is positioned within the hollow space against the internal surface of the filtration layer, and a second support made of rigid material is positioned outside the filtration layer. Preferably, the or each support is perforated to allow a gas stream to flow therethrough. The material for the support should have sufficient rigidity to withstand the forces to which the element is exposed, during assembly of the element and an assembly containing the element, and during use. The material can be metallic, for example a stainless steel.

Preferably, the filter element has a substantially constant cross-sectional shape along its length. Preferably, the cross-section of the filter element is generally round. For example, the filter element may be circular or elliptical. However, it will be appreciated that the cross-section of the filter element need not be round. For example, the cross-section could be the shape of a square, triangle, or any other regular or irregular shape.

The shape of the filter element when viewed along its axis (its cross-section shape) will generally be approximately constant over at least most of the length of the element. However, it will be appreciated that its cross-section shape need not be constant. For example, the filter element could be conical or pyramidal.

Generally, the filter element will include first and second end caps at opposite ends of the wall of the filtration medium, with the inlet provided on the first end cap. Generally, the filter element will be arranged in use with the first end cap located above the second end cap, when the first end cap might be referred to as the top end cap, and the second end cap referred to as the bottom end cap.

The cross-sections of the end caps and the wall at their interfaces should be broadly the same so that the end caps can be fitted together with the wall to provide fluid tight seals. Preferably, the filtration layer, with the drainage layer when present, is retained and sealed within a trough which is provided in the first end cap, so that there is no path for gas to flow past the filtration medium.

When a second end cap is provided, it can be preferred for the filtration layer to be retained and sealed within a trough which is provided in the second end cap, so that there is no path for gas to flow past the filtration medium. Preferably, the drainage layer extends from the wall of the filter element over at least a part of the external surface of second end cap, over the face thereof which faces away from the first end cap. This can facilitate drainage of coalesced fluid from the drainage layer of the filter element, into a reservoir in the assembly from which it can be collected, for example for disposal. Details of a filter element in which the drainage layer extends from the wall of the filter element over at least a part of the external surface of second end cap, over the face thereof which faces away from the first end cap are disclosed in the co-pending PCT application filed with the present application which claims priority from UK Patent Application No. 0417455.3. Subject matter that is disclosed in that application is incorporated in the specification of the present application by this reference.

When a second end cap is provided, and when the drainage layer extends from the wall of the filter element over at least a part of the external surface of second end cap, over the face thereof which faces away from the first end cap, the part of the drainage layer between the second end cap and the housing can be compressed by at least one longitudinally extending fin. This can facilitate drainage of coalesced fluid from the drainage layer of the filter element, into a reservoir in the assembly from which it can be collected, for example for disposal. The effective engagement of the housing wall with the second end cap, through the fin and the drainage layer, can also help to locate the filter element in the housing transversely. This can facilitate the formation of a reliable seal between the housing and the filter element which might otherwise be disturbed if the element is able to move transversely within the housing. The transverse location of the element in the housing operates in conjunction with the axial location provided by the interengaging rib and groove. Details of a filter assembly in which the part of the drainage layer between the second end cap and the housing are compressed by at least one longitudinally extending fin are disclosed in the co-pending PCT application filed with the present application which claims priority from UK Patent Application No. 0417459.5. Subject matter that is disclosed in that application is incorporated in the specification of the present application by this reference.

The filtration medium (or one or more layers thereof) can be sealed to an end cap using a quantity of a bonding material such as an adhesive. The bonding material should be selected according to fluids with which the element will come into contact when in use so that there are no adverse reactions between the bonding material and the fluids. The filtration medium might be sealed to an end cap using other techniques such as welding, for example by localised application of heat, or by ultrasonic welding.

The drainage medium (or one or more layers thereof) can be sealed to an end cap using a quantity of a bonding material such as an adhesive. The bonding material should be selected according to fluids with which the element will come into contact when in use so that there are no adverse reactions between the bonding material and the fluids. The drainage medium might be sealed to the first end cap using other techniques such as welding, for example by localised application of heat, or by ultrasonic welding.

Preferably one or each of the end caps is formed from a polymeric material. Preferred polymeric materials include polyolefins (especially polyethylene and polypropylene), polyesters, polyamides, polycarbonates and the like. Polymeric materials used for the end caps can be reinforced, for example by fibrous materials (especially glass fibers or carbon fibers). Materials other than polymeric materials can be used, for example metals. The first and second end caps will generally be formed from the same material or materials.

Preferably one or each end cap is formed by molding, for example, by injection molding.

Preferably, the second end cap includes an upstand portion which extends towards the first end cap, into the space within the filter element. This can help to encourage fluid to flow transversely towards the wall of the element. Preferably, the upstand portion is located centrally within the element.

Preferably, the upstand portion of the second end cap tapers inwardly towards the end thereof which is closer to the first end cap. The upstand portion can have a substantially constant cross-sectional shape along its length. Preferably, the cross-section of the upstand portion is generally round, for example elliptical or especially circular.

When the second end cap includes an upstand portion that has a circular cross-section, and when the second end cap includes a flange and a stem, preferably the stem and the upstand portion are co-axial, and preferably the diameter of the upstand portion is the same as that of the stem. This can ease construction of the second end cap, especially when the second end cap is formed by molding.

The housing should provide an inlet port for a gas stream to flow into the housing, and an outlet port through which gas which has passed through the filtration medium can leave the housing. The ports will generally be provided in the housing head.

Preferably, the housing includes a reservoir in which any coalesced liquid which drains from the drainage layer can collect. The reservoir can be provided by a space within the housing below the filter element.

The housing can include a drain outlet for any coalesced liquid which drains from the drainage layer. The outlet will generally provide for removal of liquid which has collected in a reservoir. The drain should preferably be capable of opening without depressurising the housing. A suitable drain mechanism is disclosed in European Patent No. EP-A-81826.

The housing should be formed from a material which is capable of withstanding the internal pressures to which it is subjected when in use. Metals will often be preferred, for example aluminium and alloys thereof, and certain steels.

The inlet at the end cap of the filter element should be capable of coupling with a part in a housing for the element so that a tight seal is formed. This can ensure that all gas that enters the inlet of the filter assembly, enters the filter element. Techniques for sealing inlet ports are known, for example as disclosed in PCT Application No. WO-A-99/30798.

Preferably, the inlet on the end cap of the filter element has a compressible O-ring seal for forming a fluid tight seal with the head part of the housing.

Preferably, the inlet on the end cap of the filter element is provided by a flow conduit which extends into the head part of the housing when the assembly is assembled. The head part of the housing can present a bore in which the end of the flow conduit is received. The head part of the housing can have a housing flow conduit within it whose end provides a bore in which the end of the flow conduit is received. The end of a housing flow conduit can be received in a flow conduit on the filter element end cap.

Preferably, the housing includes a reservoir in which any coalesced liquid which drains from the drainage layer can collect. The reservoir can be provided by a space within the housing below the filter element.

The housing can include a drain outlet for coalesced liquid which drains from the drainage layer. The outlet will generally provide for removal of liquid which has collected in a reservoir. The drain should preferably be capable of opening without depressurising the housing. A suitable drain mechanism is disclosed in European Patent No. EP-A-81826.

The housing should be formed from a material which is capable of withstanding the internal pressures to which it is subjected when in use. Metals will often be preferred, for example aluminium and alloys thereof, and certain steels.

Preferably, the parts of the housing fit together for the purposes of connection in such a way that the body part as a male part fits within the head part as a female part.

Preferably, the formations on the head and body parts of the housing are screw thread formations. Therefore, as the head and body parts are rotated relative to each other to disengage them from one another, the head is caused to move axially away from the body. Other formations which might be used include cooperating bayonet formations.

BRIEF DESCRIPTION OF THE DRAWINGS

Embodiments of the invention will now be described, by way of example only, and with reference to the accompanying drawings, in which:

FIG. 18b is a schematic perspective view of the second piece of the two piece flow conduit shown in FIG. 18a.

DETAILED DESCRIPTION OF THE PREFERRED EMBODIMENT

Figure 2:
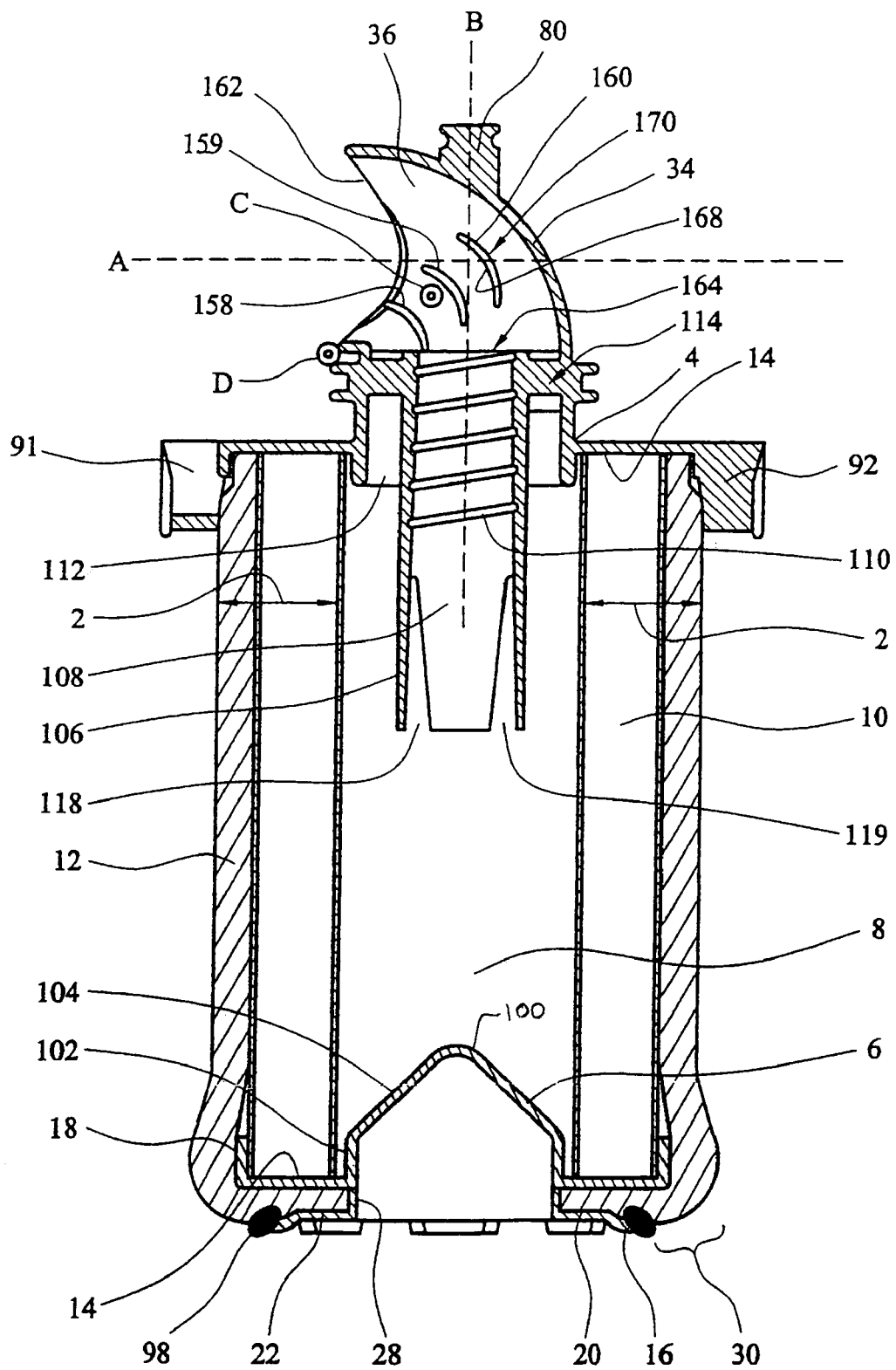
FIG. 2 is a sectional side elevation through a filter element according to the present invention.

Referring to the drawings, FIG. 2 shows a filter element which comprises a cylindrical wall section 2 formed from a filter medium, and top and bottom end caps 4 and 6.

The wall section 2 defines a hollow space 8 within it. The filter medium of the wall 2 comprises a cylindrical filtration layer 10 and a cylindrical anti-reentrainment layer or drainage layer 12 which fits snugly around the filtration layer on the outside of the filter element.

The top end cap 4 contains a flow conduit 34 which defines a flow path 36 for gas which is to be filtered. The flow conduit 34 has a port 80 in it for connection to a gauge for measuring the differential pressure across the filter element. When the filter element is located within a housing (described in more detail below) the port 80 can be received in a downwardly facing socket in the housing head, forming a seal by compression of an O-ring between the external surface of the port and the internal surface of the socket.

The flow conduit 34 has a first opening 162 having a first axis A, and a second opening 164 having a second axis B. The angle between the axes A, B of the first 162 and second 164 openings is 90°. The flow conduit 34 provides a continuous flow path between the two openings, and therefore provides a smooth change of direction for gas flowing therethrough when in use. The flow conduit 34 turns about an axis D which extends perpendicularly to the axes A, B of the first 162 and second 164 conduit openings. (As shown in FIG. 2, the axis D about which the flow conduit 34 turns extends perpendicularly to the plane along which the cross-section of FIG. 2 of the filter element is taken).

The flow conduit 34 contains first 158, second 159 and third 160 curved vanes extending perpendicularly across the flow conduit. Each vane curves around its own axis and the radius of curvature is the same for each vane. Further, the length of the vanes, measured between their leading and trailing edges, is the same for each vane. The axes around which the vanes curve extend perpendicularly to the axes A, B of the first and second conduit openings 162, 164. For example, as shown in FIG. 2, the second vane 159 curves around an axis C which extends parallel to the axis D about which the flow conduit 34 turns. The vanes each have concave 168 and convex 170 surfaces, wherein the concave surface of each vane faces the first 162 and second 164 openings of the flow conduit 34. Therefore, the vanes help guide the flow of gas between the first 162 and second 164 openings.

Figure 11:
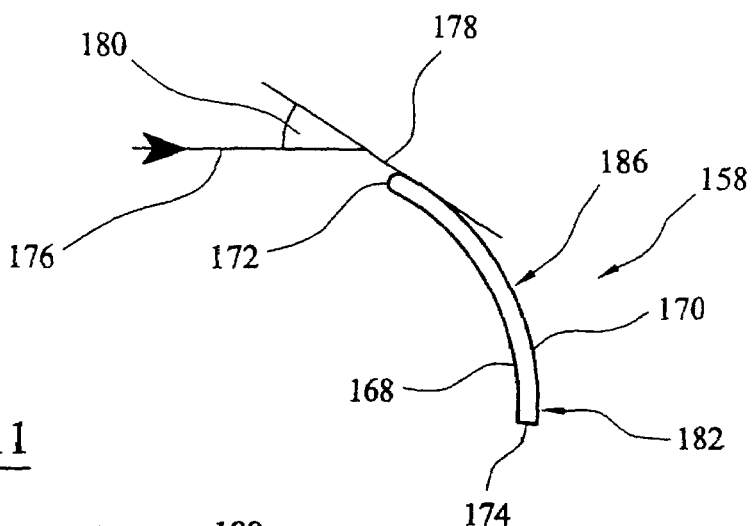
FIG. 11 is a sectional elevation of the first vane of the filter element shown in FIG. 2.

The shape and configuration of the first 158, second 159 and third 160 vanes is identical and shown in more detail with reference to the first vane 158 in FIG. 11. As shown, the first vane 158 has a rounded leading edge 172 which faces into the direction of the flow of gas 176 when the filter element is in use, and a trailing edge 174. The thickness of the first vane 158 is substantially constant between its leading and trailing edges. The vane has a straight portion 182 proximal its trailing edge 174, and a curved portion 186 extending between its leading edge and the straight portion. The length of the straight portion 182 is 5% of the total length of the vane 158 between its leading 172 and trailing 174 edges. The angle of incidence of the vane to the flow of gas when in use (i.e. the angle 180 between a straight line 176 projecting parallel to the direction of the flow of gas immediately upstream of the vane 158 and a straight line 178 projecting tangentially from the convex surface 170 of the vane at its leading edge 172) is 4°.

Figure 12:
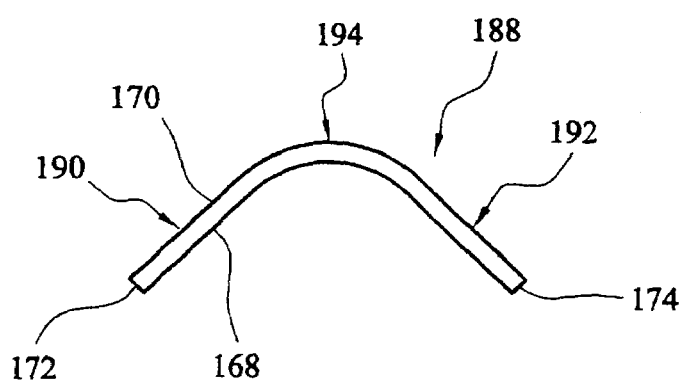
FIG. 12 is a sectional elevation of the first vane of the filter element shown in FIG. 2 according to a second embodiment.

The first 158, second 159 and third 160 vanes need not have the shape and configuration of the vane shown in FIG. 11. For example, the vanes can have the shape and configuration of an elbow shaped vane 188 as shown in FIG. 12. The elbow shaped vane 188 is substantially similar in configuration to that shown in FIG. 11 and like parts share like reference numerals. However, the elbow vane 188 has a straight leading portion 190 proximal its leading edge 172, as well as a straight trailing portion 192 proximal its trailing edge 174 and a curved portion 194 between them.

Figure 13:
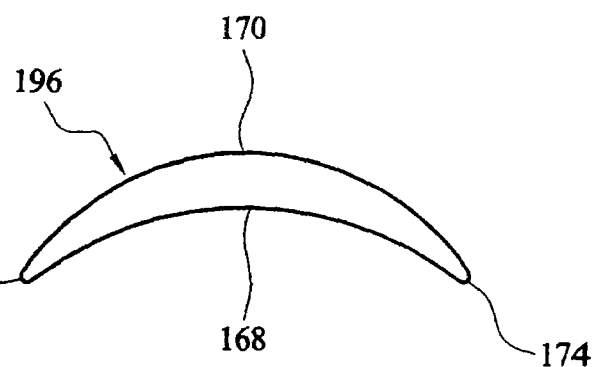
FIG. 13 is a sectional elevation of the first vane of the filter element shown in FIG. 2 according to a third embodiment.

Further, the first 158, second 159 and third 160 vanes can have the shape and configuration of the crescent shaped vane 196 shown in FIG. 13. The crescent shaped vane 196 is substantially similar in configuration to that shown in FIG. 11 and like parts share like reference numerals. However, the thickness of the crescent shaped vane 196 is not uniform between its leading 172 and trailing edges 174. Instead, the thickness of the crescent shaped vane 196 continuously increases as you travel from its leading edge 172 towards the midpoint between the leading and trailing 174 edges, and continuously decreases as you travel from the midpoint to the trailing edge.

Figure 14:
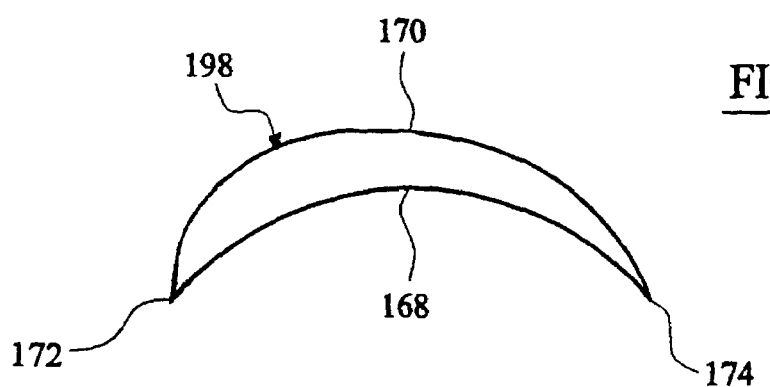
FIG. 14 is a sectional elevation of the first vane of the filter element shown in FIG. 2 according to a fourth embodiment.

Further still, the first 158, second 159 and third 160 vanes can have the shape and configuration of the curved-aerofoil shaped vane 198 shown in FIG. 14. The curved-aerofoil shaped vane 198 is similar in configuration to that shown in FIG. 11 and like parts share like reference numerals. However, the thickness of the curved-aerofoil shaped vane 196 is not uniform between its leading 172 and trailing 174 edges and is generally thicker towards its leading edge than towards its trailing edge.

Referring now back to FIG. 2, the gap/chord ratio of the first 158, second 159 and third 160 vanes shown in FIG. 2, is 0.45.

The first 158, second 159 and third 160 vanes are arranged such that radius ratio of all of the sub-flow conduits (described in more detail below in relation to FIG. 17) is at least 1.

The first 158, second 159 and third 160 vanes are arranged such that aspect ratio for all the sub-flow conduits is at least 1.

Figure 15:
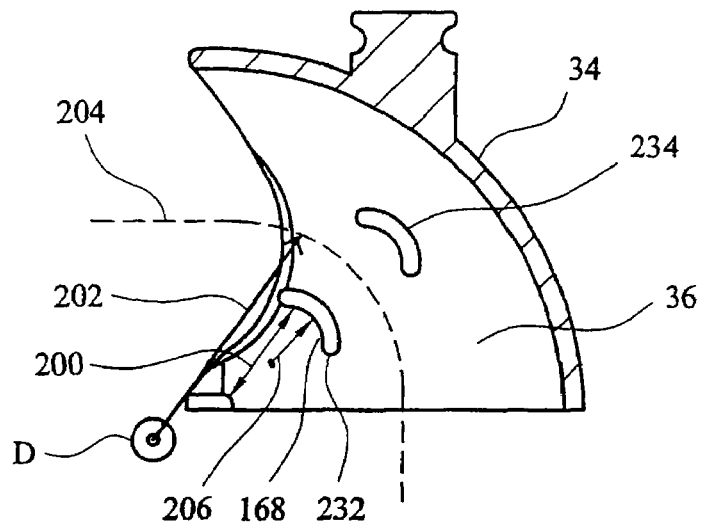
FIG. 15 is a sectional elevation view of a flow conduit according to the invention illustrating the calculation of the position of the first vane.
Figure 16:
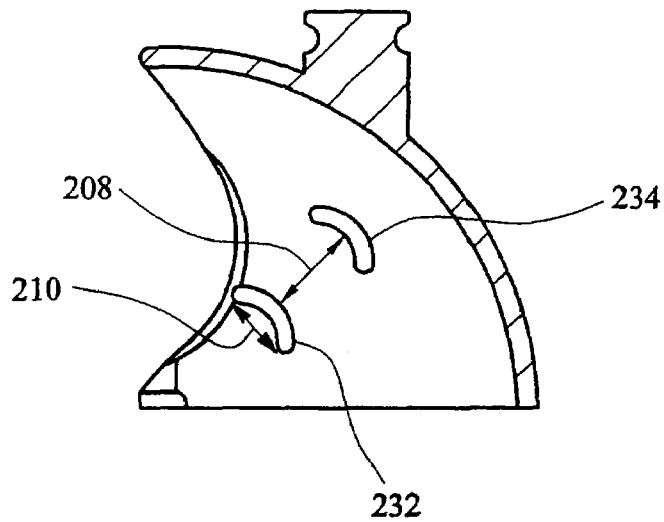
FIG. 16 is a sectional elevation view of the flow conduit shown in FIG. 15 illustrating the calculation of the gap/chord ratio of the vanes.
Figure 17:
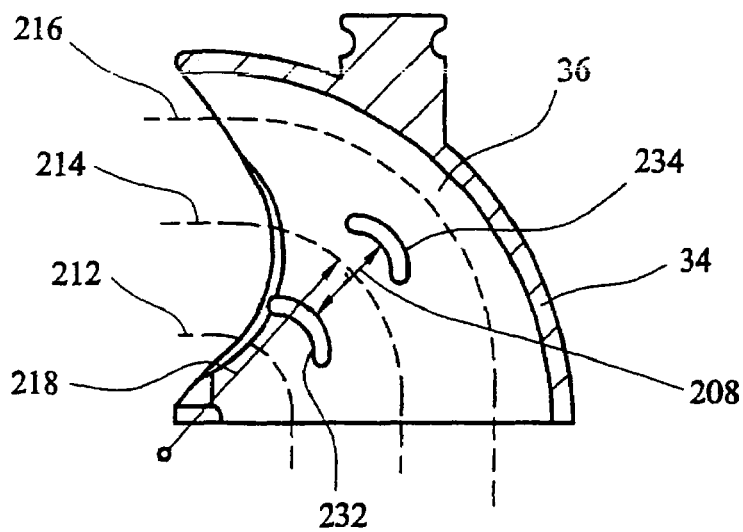
FIG. 17 is a sectional elevation view of the flow conduit shown in FIG. 15 illustrating the calculation of the radius ratio and the aspect ratio of the sub-flow conduits defined by the vanes.

FIGS. 15 to 17 illustrate how the preferred distance between the concave surface of the inner most vane and wall of the flow conduit the concave surface of the vane faces, the gap/chord ratio, and the radius ratio and aspect ratio for a flow conduit with vanes, can be calculated. For sake of simplicity of illustration, the flow conduits 34 of FIGS. 15 to 17 contain only a first vane 232 and a second vane 234. Otherwise, all other parts of the flow conduit 34 of FIG. 15 are the same as that shown in FIG. 2 and share the same reference numerals.

As illustrated in relation to FIG. 15, the preferred positioning of the inner most vane (i.e. the first vane 232) can be calculated so that the distance 200 between its concave surface 168 and wall of the flow conduit the concave surface of the vane faces, is equal to: $R - r \cos \theta/2$, where (R) is the radius of the curvature 202 of the centre line 204 of the turn of the flow conduit 34, (r) is the radius of the curvature 206 of the first vane 232, and θ is the angle between the axes of the first 162 and second 164 conduit openings (i.e. 90° as shown in FIGS. 2 and 15).

As illustrated in relation to FIG. 16, the gap/chord ratio is calculated as the ratio of the distance 208 between the midpoints of the first 232 and second 234 vanes, and the chords 210 of the vanes.

As illustrated in relation to FIG. 17, the first 232 and second 234 vanes divide the flow conduit 34 into first, second and third sub-flow conduits having first 212, second 214 and third 216 centre line of turns respectively. The radius ratio of the second sub-flow conduit having a centre line of turn 214, is calculated as the ratio of the radius of the curvature 218 of the centre line of the turn 214 of the second sub-flow conduit to the width 208 of the sub-flow conduit measured between the first 232 and second 233 vanes.

Figure 4:
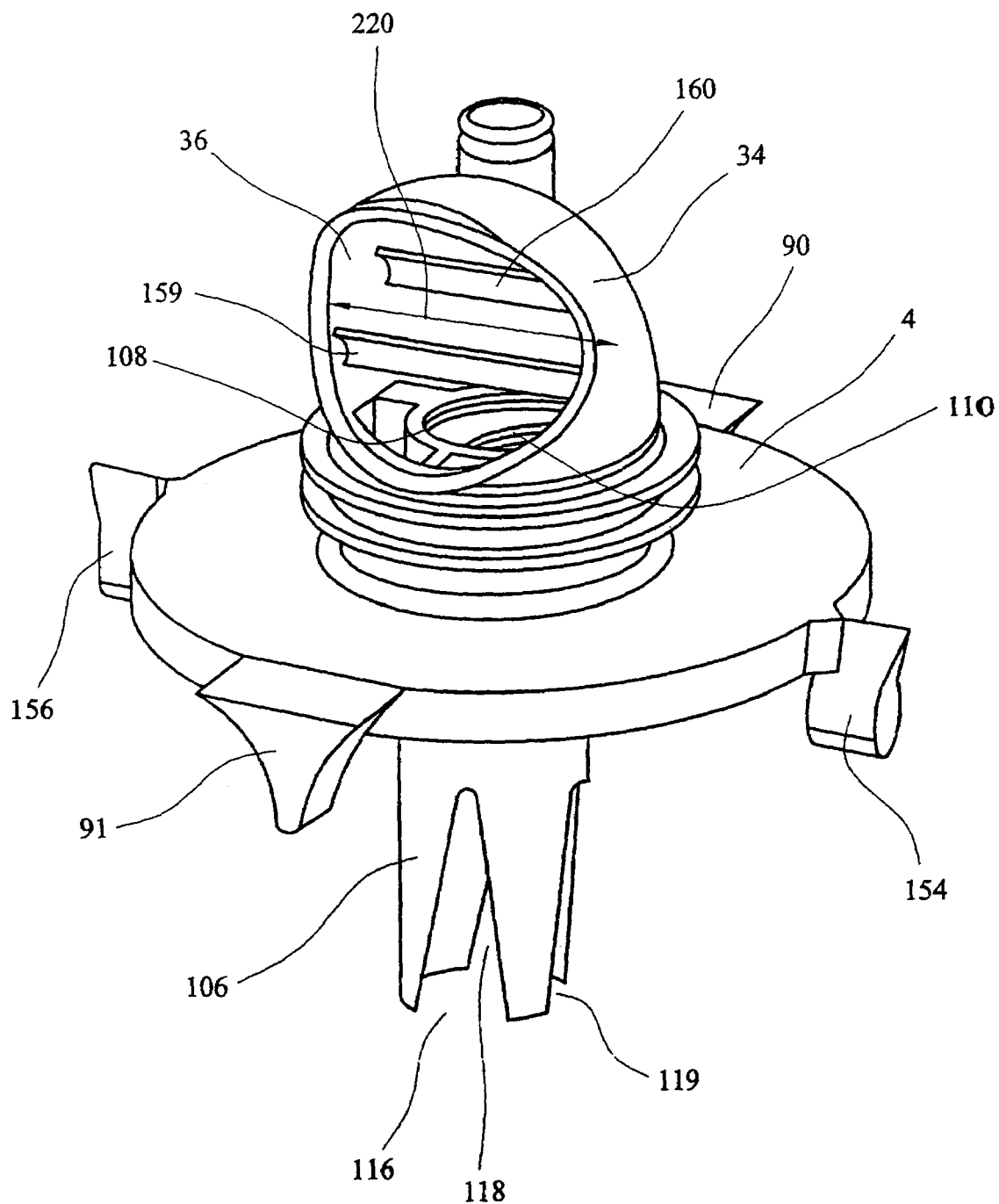
FIG. 4 is a schematic perspective view of the top end cap of the filter element shown in FIG. 2.

Still referring to FIG. 17, the aspect ratio of the second sub-flow conduit having a centre line of turn 214 is calculated as the ratio of the depth of the second sub-flow conduit to the width 208 of the second sub-flow conduit measured between the vanes. As shown in FIG. 4, the depth of a sub-flow conduit is the distance 220 between the opposing walls of the flow conduit 34 between which the vanes that define the sub-flow conduit extend.

Referring now to FIG. 2, the flow conduit 34 and the top end cap 4 of the filter element are formed as separate pieces. Further, the flow conduit 34 is formed from two pieces.

Figure 18A:
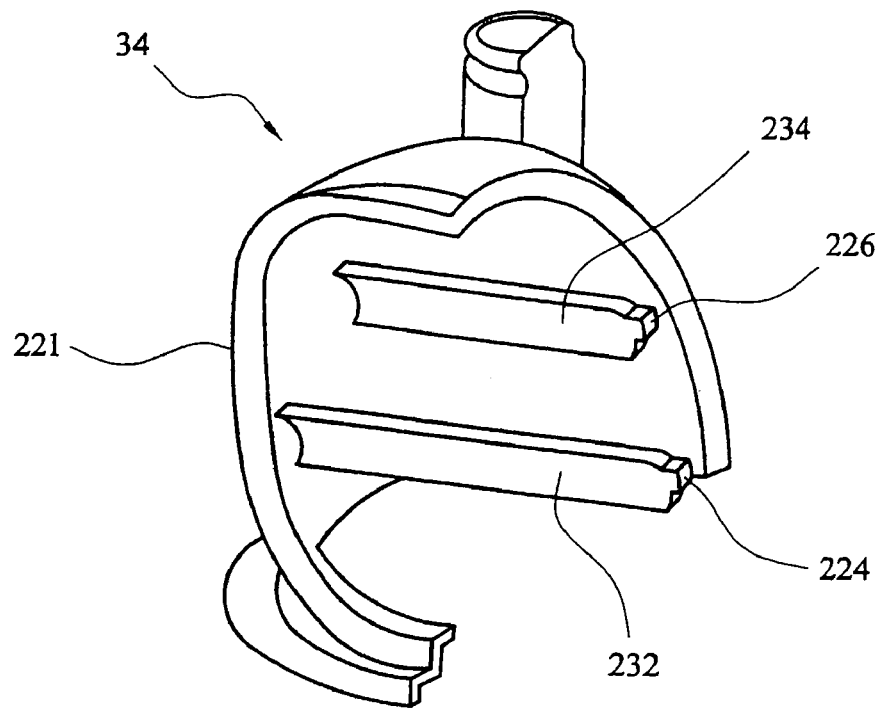
FIG. 18a is a schematic perspective view of the first piece of a two piece flow conduit according to the invention.
Figure 18B:
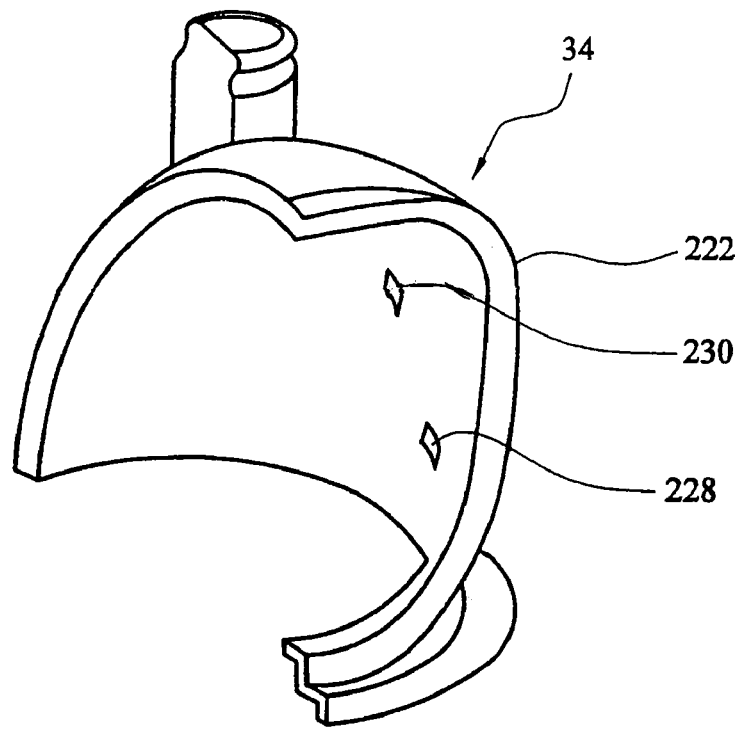

A two piece flow conduit 34 is shown in FIGS. 18a and 18b. For sake of simplicity, the flow conduit 34 of FIGS. 18a and 18b contains only a first vane 232 and a second vane 234. Otherwise, all other parts of the flow conduit 34 of FIG. 15 are the same as that shown in FIG. 2 and share the same reference numerals. With reference to FIGS. 18a and 18b, the flow conduit 34 comprises first 221 and second 222 matable pieces. The first 221 and second 222 pieces are mirror images of each other (the plane of symmetry of the pieces extending through both the axes of the first 162 and second 164 conduit openings) except that the first 232 and second 234 vanes extend from, and are part of, the first piece 221 of the flow conduit 34. The first 232 and second 234 vanes have respective tangs 224, 226 at their free ends (i.e. the ends distal to the wall of the first piece 221 from which the vanes extend) that can be received within corresponding recesses 228, 230 formed in the wall of the second piece 222 of the flow conduit 34. Therefore, when the first 221 and second 222 pieces are brought together to form the flow conduit 34, the tangs 224, 226 are received within the corresponding recesses 228, 230 so that the first 232 and second 234 vanes are secured to the second piece 222 at their free ends.

Referring back to FIG. 2, the top end cap 4 further comprises an inlet tube 106, co-axial with the top end cap 4, which extends from the second conduit opening 164 of the flow conduit 34 part way into the hollow space 8 to a downstream open end. In this embodiment, the inlet tube 106 and top end cap 4 are one piece. However, it will be appreciated that they need not be one piece. The inlet tube 106 defines a flow path 108 for gas which is to be filtered and is in fluid connection with the flow path 36 of the top end cap 4.

The top end cap 4 has annular opening 112 extending around the inlet tube 106 proximal to the flow conduit 34. The inlet tube 106 is held within the annular 112 opening by fins 114 that extend between the top end cap 4 and the inlet tube 106.

Figure 3:
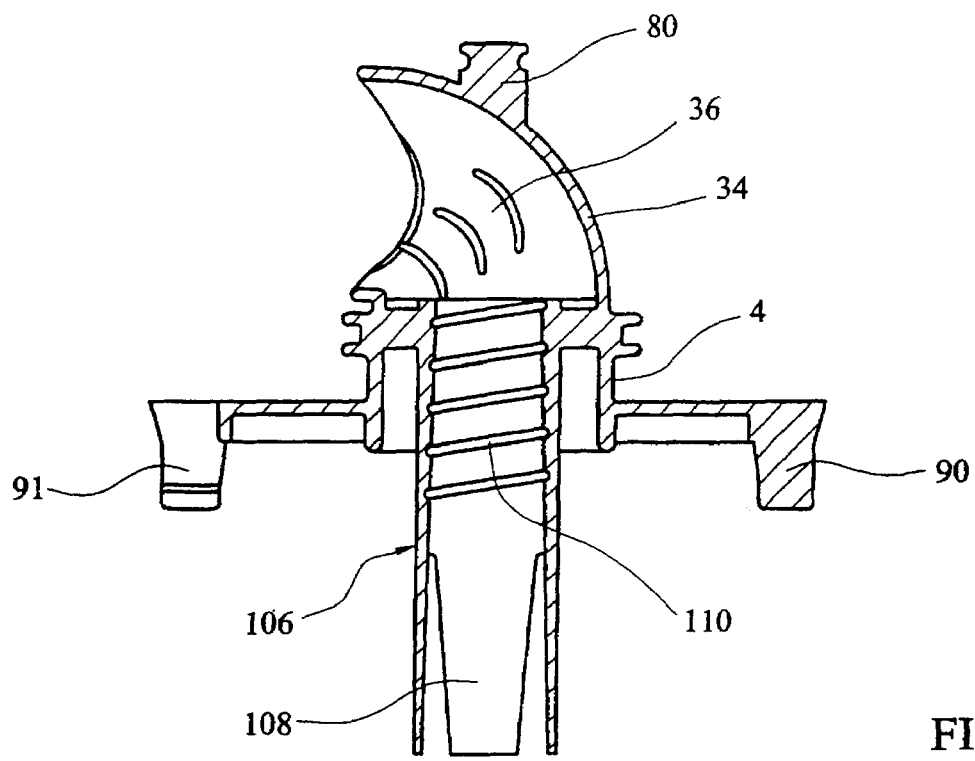
FIG. 3 is a sectional side elevation of the top end cap of the filter element shown in FIG. 2.

As best shown in FIG. 3, the inlet tube 106 has a rifling formation defined on its inner wall, extending from its end proximal to the top end cap 4, part way towards its end distal to the top end cap. The rifling formation is provided by a helically extending ridge 110 on the inner wall of the inlet tube 106.

Referring now to FIG. 4, a schematic perspective view of the top end cap 4 of FIG. 2 is shown. For simplicity and to enable illustration of the helically extending groove 110, the first vane 158 is not shown. As shown, the inlet tube 106 has first 116, second 118, third 119 and fourth (not shown) openings in its side wall. The openings are in the form of slits that taper uniformly from an open end at the downstream open end of the inlet tube 106, to a point towards the upstream open end of the inlet tube. Therefore, the proportion of the side wall of the inlet tube 106 that is open, increases towards the downstream open end of the inlet tube. The slits extend along 50% of the length of the inlet tube and in a direction parallel to the axis of the inlet tube. The slits are positioned equally around the inlet tube 106, i.e. they are spaced apart from each other by about 90E around the inlet tube.

FIGS. 6 to 10 show alternative embodiments of inlet tubes according to the invention that can be used with the top end cap 4 of FIG. 2. The top end caps 4 shown in FIGS. 6 to 10 are the same as that shown in FIG. 2. However, for simplicity, the first 158, second 159 and third 160 vanes, and also the helically extending ridge 110, are not shown.

Figure 6:
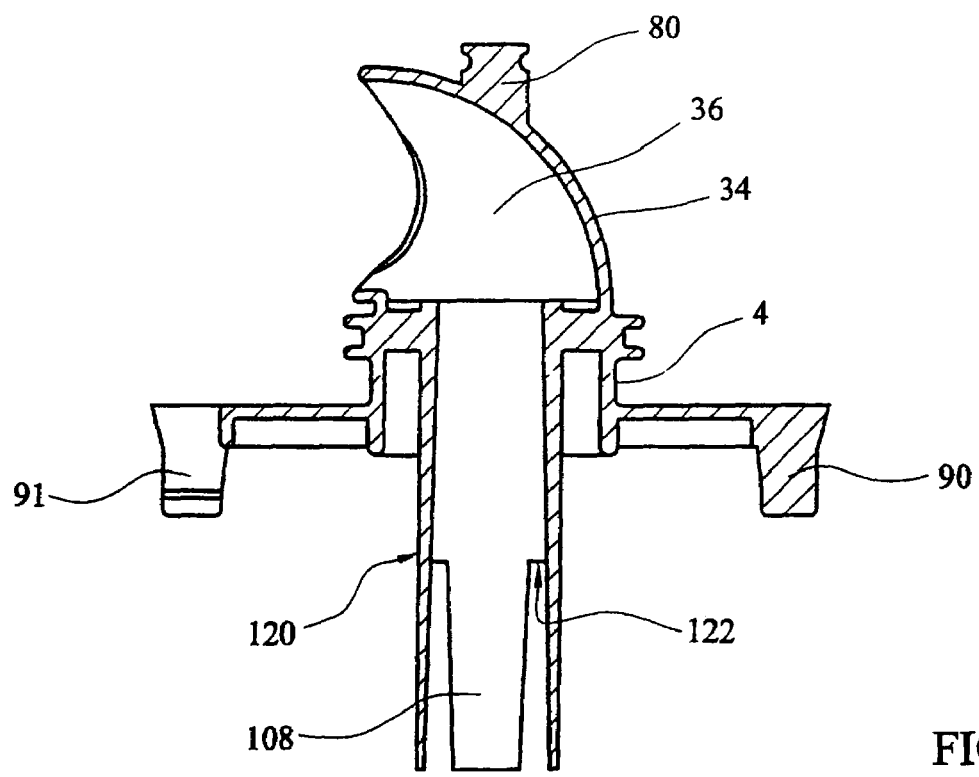
FIG. 6 is a schematic sectional elevation of the top end cap of the filter element shown in FIG. 2 illustrating a second embodiment of the inlet tube of the filter element.

FIG. 6 shows an inlet tube 120 according to the invention which is similar in configuration to that shown in FIG. 2, except that the first, second, third and fourth slits taper to a flat end 122, instead of to a point.

Figure 7:
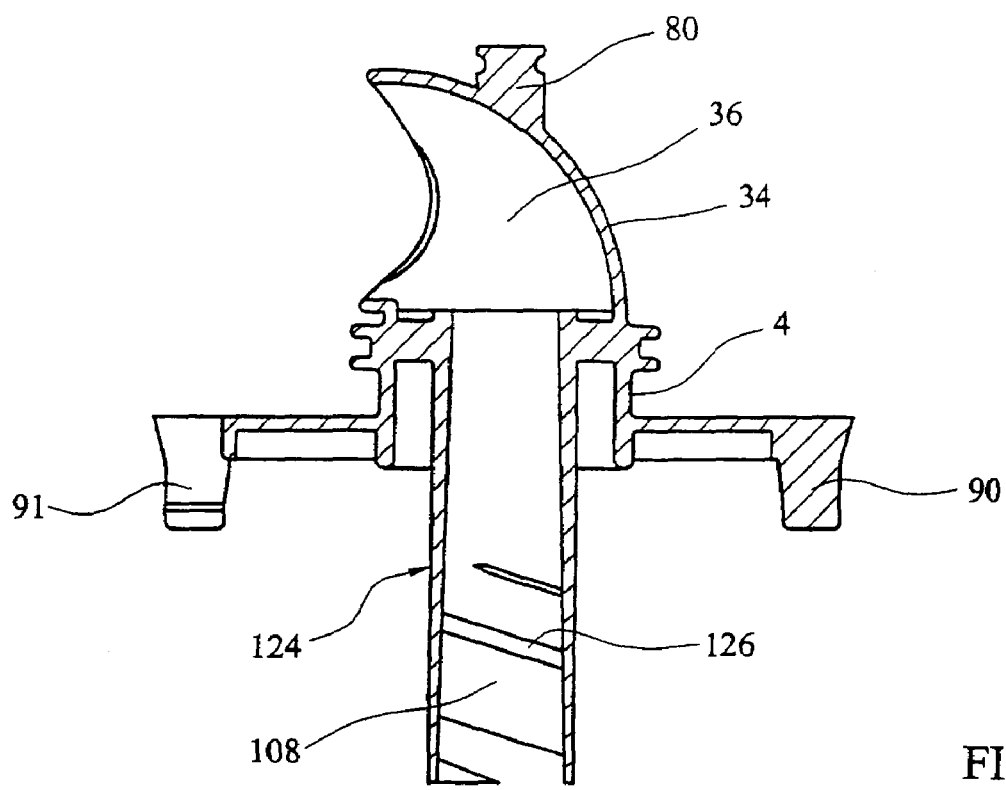
FIG. 7 is a schematic sectional elevation of the top end cap of the filter element shown in FIG. 2 illustrating a third embodiment of the inlet tube of the filter element.

FIG. 7 shows an inlet tube 124 which is similar in configuration to that shown in FIG. 2, except that the inlet tube 124 only has one opening 126, which is in the form of a helically extending slit. The helically extending slit extends from an open end at the downstream open end of the inlet tube 124, to a point towards the upstream open end of the inlet tube. As shown, the angle between the plane perpendicular to the axis of the inlet tube 124 and a straight line projecting substantially along a portion of the slit 126 is constant. However, the width of the helically extending slit 126, taken perpendicular to the straight line projecting substantially along a portion of the slit, decreases towards the upstream open end. Therefore, the proportion of the side wall of the inlet tube 124 that is open, increases towards the downstream open end of the inlet tube.

Figure 8:
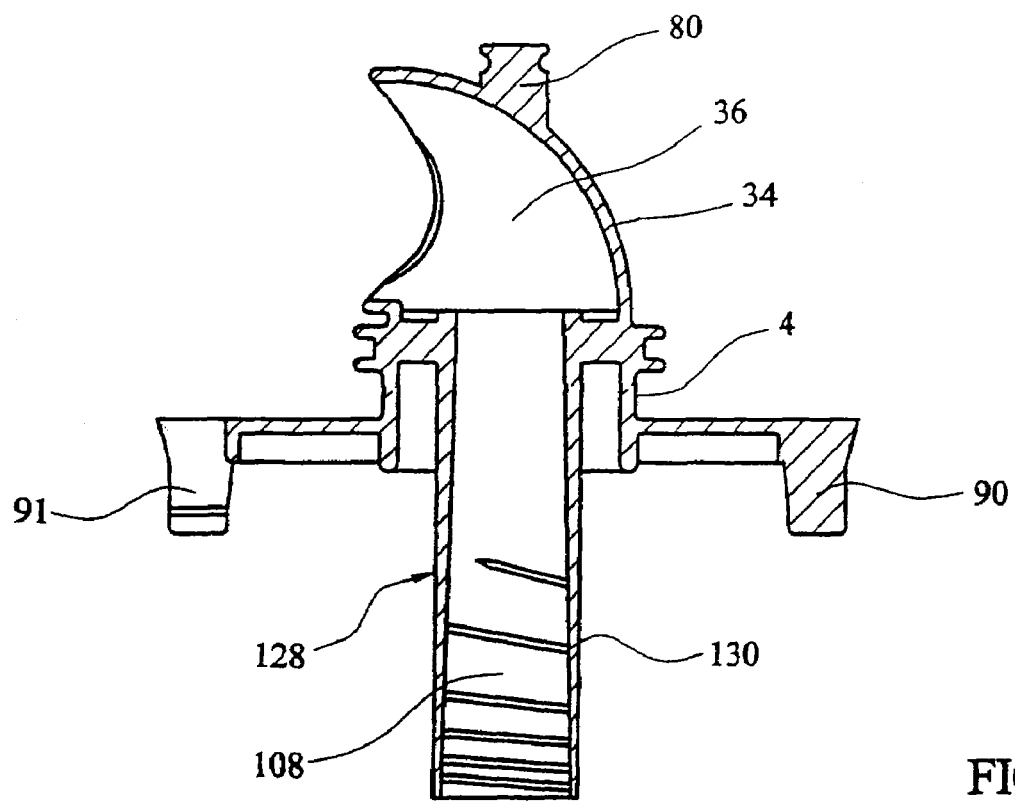
FIG. 8 is a schematic sectional elevation of the top end cap of the filter element shown in FIG. 2 illustrating a fourth embodiment of the inlet tube of the filter element.

FIG. 8 shows an inlet tube 128 which is similar in configuration to that shown in FIG. 7 in that the inlet tube 128 only has one opening 130 in the form of a helically extending slit. However, in contrast to the inlet tube 124 shown in FIG. 7, the width of the slit 130 shown in FIG. 8 in constant along its entire length. Further, the angle between the plane perpendicular to the axis of the inlet tube 128 and a straight line projecting substantially along a portion of the slit 130 decreases towards the downstream open end of the inlet tube. Therefore, the proportion of the side wall of the inlet tube 128 that is open, increases towards the downstream open end of the inlet tube.

Figure 9:
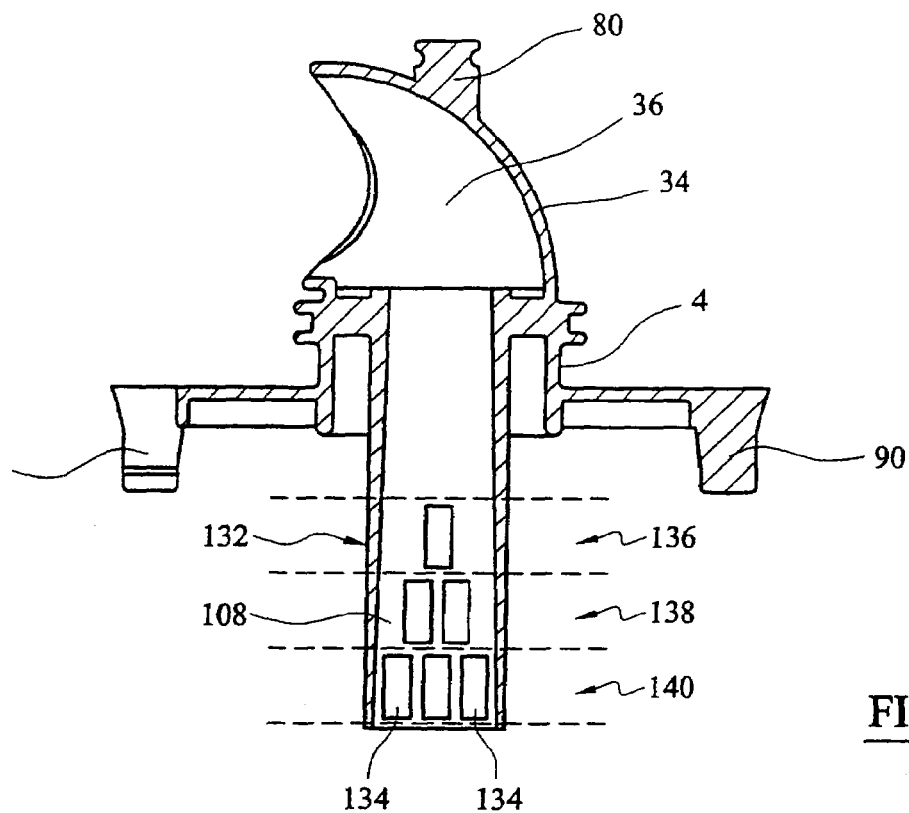
FIG. 9 is a schematic sectional elevation of the top end cap of the filter element shown in FIG. 2 illustrating a fifth embodiment of the inlet tube of the filter element.

FIG. 9 shows an inlet tube 132 which is similar in configuration to that shown in FIG. 2, except that the side wall has a plurality of openings 134 in the form of apertures. The apertures can be identified as wholly falling within three bands (an upstream band, designated generally by 136, a middlestream band 138, and a downstream band 140), extending around the inlet tube, each band defining a plane perpendicular to the axis of the inlet tube. The upstream band 136 is located within the downstream half of the inlet tube 132. Four apertures (only one of which can be seen in FIG. 9) are present in the upstream band 136, eight apertures (only two of which can be seen in FIG. 9) are present in the middlestream band 138, and twelve apertures (only three of which can be seen in FIG. 9) are present in the downstream band 140. The apertures have two equal length, straight, parallel sides, and has a convex end at each end of the aperture that extends between the parallel sides. The length of the parallel sides is longer than the transverse distance between them. All of the apertures 134 are equal in shape and dimension.

The four apertures in the upstream band 136 are positioned equally around the inlet tube 132, i.e. they are spaced apart from each other by about 90° around the inlet tube. The eight apertures in the middlestream band 138 are divided into four sets of two apertures. The four sets of two apertures are positioned equally around the inlet tube 132, i.e. they are spaced apart from each other by about 90° around the inlet tube. The twelve apertures in the downstream band 140 are divided into four sets of three apertures. The four sets of three apertures are positioned equally around the inlet tube 132, i.e. they are spaced apart from each other by about 90° around the inlet tube. Therefore, the proportion of the side wall of the inlet tube 132 that is open increases towards the downstream open end of the inlet tube.

Figure 10:
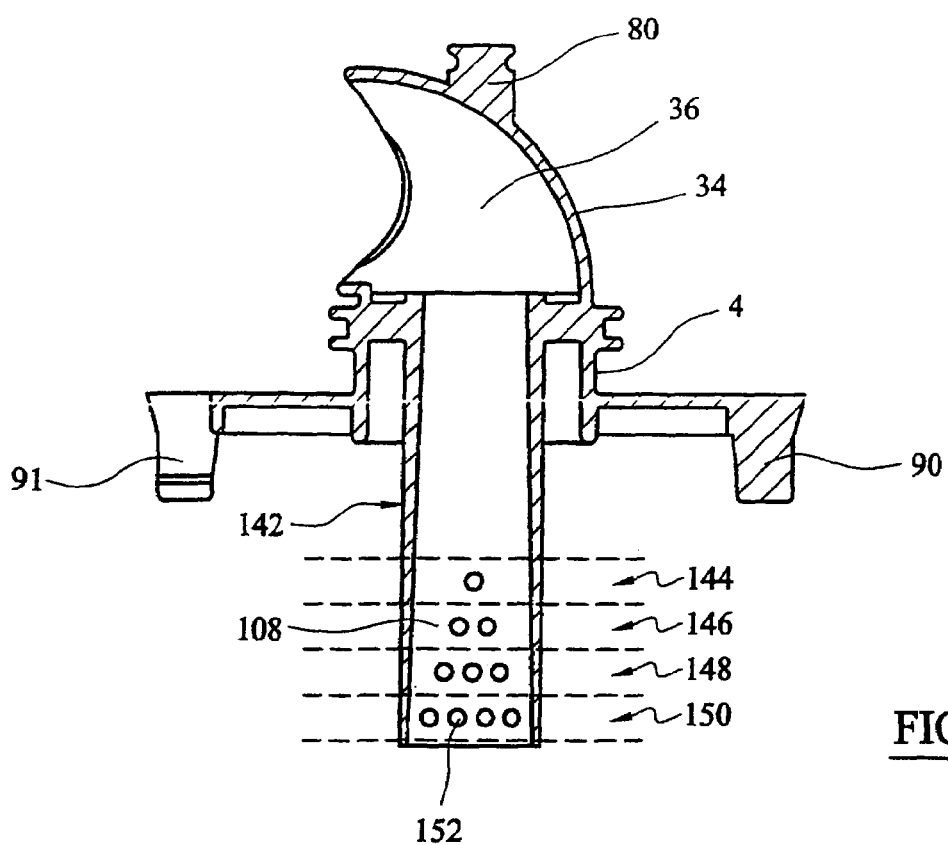
FIG. 10 is a schematic sectional elevation of the top end cap of the filter element shown in FIG. 2 illustrating a sixth embodiment of the inlet tube of the filter element.

FIG. 10 shows an inlet tube 142 which is similar in configuration to that shown in FIG. 9, except that the apertures 152 are circular in shape, and that four bands (an upstream band, designated generally by 144, an upstream middlestream band 146, a downstream middlestream band 148, and a downstream band 150) can be identified instead of three. Four apertures (only one of which can be seen in FIG. 10) are present in the upstream band 144, eight apertures (only two of which can be seen in FIG. 10) are present in the upstream middlestream band 146, twelve apertures (only three of which can be seen in FIG. 10) are present in the downstream middlestream band 148, and sixteen apertures (only four of which can be seen in FIG. 10) are present in the downstream band 150.

Referring back to FIG. 2, each of the end caps has a trough 14 formed in it. The top part of the filtration layer 10 and the drainage layer 12 are retained and sealed in the trough 14 of the top end cap 4, and the bottom part of the filtration layer is retained and sealed in the trough 14 of the bottom end cap 6.

The bottom end cap 6 further comprises a flange part 16, spaced apart from the surface 20 of the second end cap facing away from the top end cap 4. The flange part 16 extends generally transverse to the axis of the filter element. The flange part 16 is located centrally with respect to the bottom end cap 6, and is spaced from it by a co-axial stem 28 extending between them. The flange part 16 and second end cap 6 between them define an annular slot 22, in which the drainage layer can be received. The slot is tapered inwardly so that the distance between the flange and the surface of the end cap decreases progressively. The slot is therefore generally V-shaped when the end cap is viewed from one side.

The bottom part of the drainage layer 12 is wrapped over the wall 18 of the trough 14 of the bottom end cap 6 and folded under its bottom surface 20, in the annular slot 22 between the second end cap 6 and the flange part 16. The drainage layer 12 is fastened in the space 22 by means of a loop of elastic material 98, such as an elastic band or O-ring, which can be stretched to fit over the flange. The loop 98 is sized so that it is pinched between the opposing surfaces of the slot and the drainage layer: the transverse dimension of the material of the loop is slightly greater than the distance between the drainage layer and the opposing surface of the slot when the loop the tension in the loop (resulting from stretching it to fit it over the flange) is relaxed. This causes the loop and the drainage layer to be compressed slightly, so that the drainage layer is gripped in the annular slot. The diameter of the flange is smaller than the diameter of the end cap so that at least a part 30 of the drainage layer 12 folded over the bottom surface 20 is exposed.

The bottom end cap 6 also has a central upstand portion 100. The central upstand portion 100 extends from the bottom of the hollow space defined by the bottom end cap 6 towards the first end cap. The central upstand portion 100 has a generally cylindrical base 102, and a generally conical part 104 extending from the base toward the first end cap 4. The diameter of the cylindrical base 102 is the same as that of the stem 28.

Figure 1:
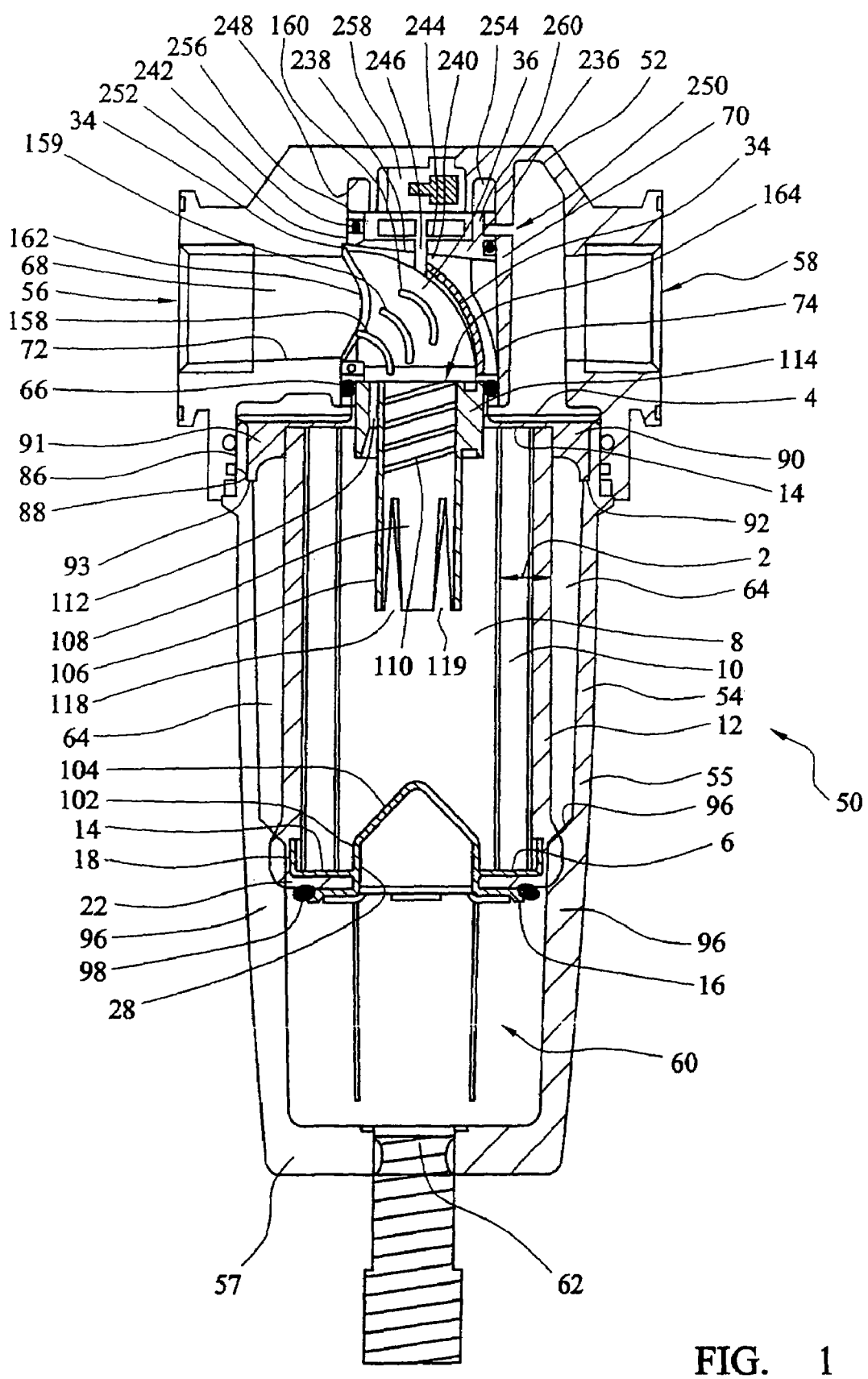
FIG. 1 is sectional side elevation through a filter assembly according to the present invention which comprises a filter element and the housing in which the element is located when in use.

Referring now to FIG. 1, an assembly according to the present invention is shown which includes a housing 50 in which the filter element shown in FIG. 2 can be located when in use. However, as shown, an alternative embodiment of a filter element which is substantially the same as that shown in FIG. 2, is located within the housing.

The filter element shown in FIG. 1 is substantially the same as that shown in FIG. 2, except that an extension 236 is provided on the external wall of the flow conduit 34 and extends away from the second conduit opening 164, instead of the port 80 for connection to a gauge. The extension 236 has seating portion 238 having a generally circular cross-section, and a fin 240 having a generally planar configuration which extends between the seating portion 238 and the flow conduit 34. The seating portion 238 provides a generally flat surface 244 and a wall 256 which extends around the periphery of the surface and away from the second conduit opening 164. A differential pressure measuring device (discussed in more details below) can be received by and contained within the area defined by the surface 244 and wall 256 of the seating portion. The extension 236 is configured so that the axis of the circular seating portion 238 is angled relative to the axis of the second conduit opening 164 by 5°. Therefore, as shown in FIG. 1, when viewed in cross-section, the seating portion 238 appears slanted relative to the filter element. A groove 242 that is capable of receiving an O-ring is formed around the periphery of the wall 256. A vent 246 that extends between the flow path 36 of the flow conduit 34 and the surface 244 of the seating portion 238 is formed within the extension 236.

The housing comprises a head 52 and a body 54 which can be connected to one another by means of cooperating screw threads (as is well established) at their interfaces 86, 88. The head and body are formed from a metallic material, especially aluminium or an alloy thereof. They can be formed by machining, or by techniques such as casting.

The housing body comprises a cylindrical wall 55, an end wall 57 at one end of the internal wall, and an open end at the opposite end of the cylindrical wall. The housing body defines a space within which the filter element is coaxially located when in use. Liquid drops which drain from the drainage layer are collected in a reservoir 60 in the housing body. The housing includes a drain outlet 62, for example of the kind which is disclosed in European Patent No. EP-A-81826.

Figure 5:
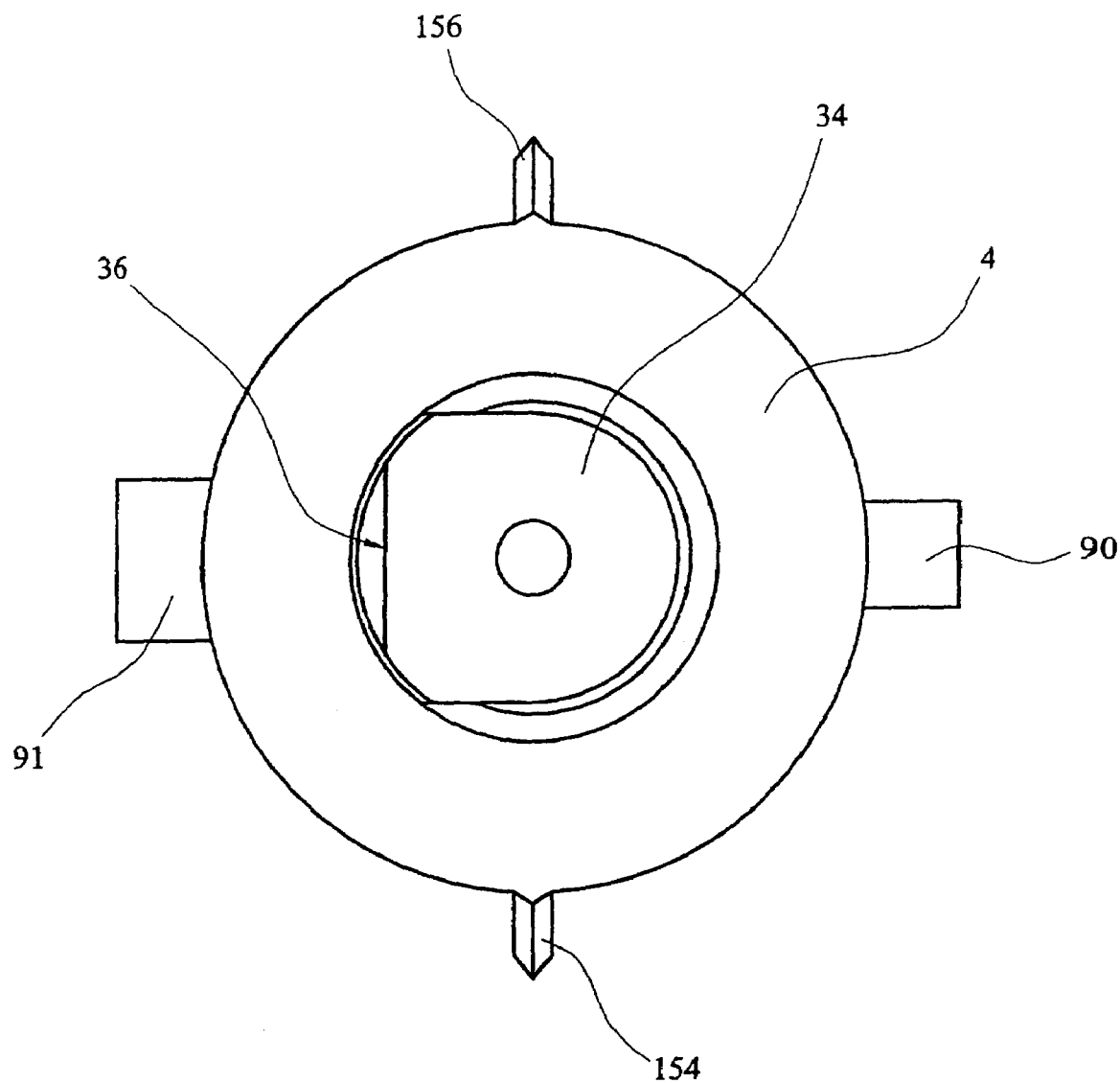
FIG. 5 is a schematic top view of the top end cap of the filter element shown in FIG. 2.

The filter element fits on to the housing body by means of inter-engaging formations in the form of ribs and grooves. The top end cap 4 has first 90, second 91, third 154 and fourth 156 ribs (for example as shown in FIGS. 4 and 5) around its perimeter that extend from the top end cap towards the bottom end cap, on the exterior of the filter element. The four ribs are spaced apart about 90° around the top end cap. Further, the first 90 and second 91 ribs are spaced about 180° around the top end cap. The first 90 and second 91 ribs are received in the housing body by means of correspondingly shaped and positioned first 92, second 93, grooves provided in the interior of the housing body at the open end.

The third and fourth ribs 154, 156 are identical in shape size and configuration. The leading edge of the third and fourth ribs 154, 156 (which is directed into the gas stream) is rounded and the trailing edge of the rib is tapered inwardly, towards (optionally to) a sharp edge or point. These ribs 154, 156 are approximately aerofoil-shaped when viewed in cross-section (perpendicular to the axis of the assembly). This shape gives minimal resistance to the flow of gas past the ribs. In contrast to the first 90 and second 91 ribs, there are no corresponding grooves for the third 154 and fourth 156 ribs. Instead, the axial faces of the third 154 and fourth 156 ribs match the profile of the housing body so that they rest against the body when the filter element has been fitted within the housing body.

The first and second ribs 91, 90 are shaped differently to that of third and fourth ribs 154, 156. The leading edge of the first and second ribs 90, 91 are rounded, and the trailing end is flared outward from the rounded leading edge. The first and second ribs 90, 91 have an approximately tapered "V" shape when viewed in cross-section (perpendicular to the axis of the assembly) with a flat top surface extending between the ends of the "V".

As can be seen in FIG. 1, the second rib 91 is located under the internal cylindrical wall 72 of the head 52 of the housing 50 (discussed in more detail below). Therefore, when the filter assembly is in use, the tapered sides of the second rib 91 aids the flow gas around the internal cylindrical wall 72, and towards the outlet port 58. The first rib 90 is located below the output port 58. Therefore, in order to minimize the direction of gas away from the output port, the width of the first rib 90 at its widest point is smaller than that of the second rib 91. Further, due to the first rib 90 and its corresponding first groove 92 being narrower than the second rib 91 and its corresponding second groove 93, the filter element can only be inserted into the body in one orientation. This can ensure that when the housing is assembled, the inlet port 56 of the housing head 52 (described in more detail below) is aligned with the flow conduit 34 of the top end cap 4, rather than incorrectly aligned with the outlet port 58 of the housing head. This is especially true when the housing head and body are configured so that they can only fit together in one orientation. This can be achieved by providing a single start screw thread at the interfaces 86, 88 of the housing head and body.

The filter element is assembled in the housing body by locating the first and second ribs 90, 91 with the first and second grooves 92, 93 of the housing body 54, and then sliding the ribs into the grooves until they sit on the bottom of the grooves. Once the ribs have been fully received by the grooves, the filter element is securely suspended within the housing body. Therefore, as will be appreciated, the axial position of the filter element within the housing body can be controlled by the shape and size of the ribs and grooves. Further, rotation of the filter element relative to the housing body is inhibited by the interlocking of the ribs with the grooves.

Once the filter element is appropriately assembled in the housing body, an annular space 64 is defined between the filter element and the housing. The filter element can be removed from the housing body 54, by pulling the filter element away from the housing body along its axis.

The housing body 54 has two a plurality of fins 96 extending along the cylindrical wall 55, parallel to the axis of the housing body. The number of fins 96 provided on the cylindrical wall 55 of the housing body 54 can depend on the size of the housing body. For example, in general, the larger the housing body, the greater the number of fins 96 provided. Typically, the minimum number of fins 96 provided will be two. In the embodiment shown, the housing body has six fins 96, however, only two are shown. The fins extend from the end wall 57 of the housing body towards the open end, and are spaced uniformly around the cylindrical wall 55 of the housing body 54. When the filter element is assembled in the housing body so that the ribs have been fully received within the grooves, the part of the drainage layer 12 which extends over the bottom end cap 6 is compressed between the bottom end cap and the edge of the fins 96. Accordingly, the transverse position of the filter element within the housing body can be controlled by the shape and size of the fins. The cross-section of the edge of the fins which contacts the drainage layer, taken perpendicular to the length of the ridge, is a rounded convex shape. As a result of the local compression of the drainage layer between the fins and the second end cap, liquid collected in the drainage layer is encouraged to drain from it, along each fin.

The housing head includes an inlet port 56 which communicates with the flow conduit 34 on the top end cap 4 through a transversely extending primary chamber 68 within the housing head. The primary chamber 68 is defined by an internal cylindrical wall 72 extending transversely within the housing head, and an internal end wall 70 opposite the inlet port 56. The internal cylindrical side wall 72 and end wall 70 are integral to the housing head. A first circular aperture 74, coaxial with the housing head, is defined within the part of side wall of the inlet conduit that is proximal to the filter element when assembled. A recess 248, that extends away from the filter element when the assembly is assembled, and that is coaxial with the housing head, is formed within the primary chamber 68. Further, a vent 250 that extends between the primary chamber 68 and the area surrounding it is formed in the end wall 70.

The housing head 52 is secured to the body 54 (once the filter element has been located in the housing body) by locating the flow conduit 34 of the top end cap 4 in the primary chamber 68 of the housing head through the circular aperture 74. The flow conduit 34 has an O-ring 66 on its external surface which is received by the aperture 74, in which it is compressed to form a fluid tight seal. The seating portion 238 also has an O-ring 252 which is compressed between the groove 242 of the seating portion and the side wall of the recess 248 within primary chamber 68, to form a fluid tight seal, thereby defining an auxiliary chamber 254 within the primary chamber.

The housing head 52 and body 54 are secured by rotating one relative to the other so that their cooperating screw threads at their interfaces 86, 88, are tightened to interlock with each other. Once the head is properly secured to the body 54 the vent 250 in the end wall 70 of the housing head 52 extends between the auxiliary chamber 254 and the area within the housing head surrounding the primary chamber 68.

A device 258 for measuring differential pressure is contained within the area defined by the surface 244 and the wall 256 of the seating portion 238. Suitable differential pressure measuring devices are known in existing products, for example in products sold by Domnick Hunter Limited under the trade mark OIL-X. The device 258 can be secured to the seating portion 238 by frictional forces between it and the wall 256 of the seating portion 238; i.e. the device is a secured to the seating portion 238 by a "press-fit" connection. However, other techniques can be used to secure the pressure measuring device, for example a threaded engagement or an adhesive. An O-ring 260 is provided on the pressure measuring device 258 which is compressed between the device and the wall 256 to provide a fluid tight seal between the vent 246 within the extension 236 and the auxiliary chamber 254. As the vent 246 within the extension 236 is in fluid communication with gas upstream of the filter element and the auxiliary chamber 254 is in fluid communication with gas downstream of the filter element via the vent 250 in the end wall 70, the pressure measuring device is capable of measuring the pressure drop across the filter element.

The filter assembly can be disassembled by rotating the housing body 54 relative to the head 52 so that their cooperating screw threads are loosened. Any rotational force that is imparted on the top end cap 4 of the filter element by stictional forces between the O-rings 66, 252 of the end cap 4 and the housing head is negated by the opposite rotational drive that is provided by the first and second ribs 90, 91 acting against the first and second grooves 92, 93 in the housing body in which the ribs are received. Therefore, as the housing body 54 is rotated relative to the housing head 52, the filter element will tend to reside in the housing rather than be drawn away from the body with the head, and hence when the housing head 52 is removed from the housing body 54, the filter element will remain located within the body, rather than being removed from the body with the head.

The housing head includes an outlet port 58 through which gas which has passed through the wall 2 of the filter element can be supplied to a downstream application. The outlet port communicates with the annular space 64 between the wall of the filter element and the internal wall of the housing.

In use, a gas that is to be filtered enters the filter assembly through the inlet port 56 in the housing head and is directed to the hollow space 8 in the filter element by means of the primary chamber 68 in the housing head and the flow paths, 36 and 109 in the flow conduit of the filter element, and the inlet tube, respectively. A helical flow is imparted in the gas stream entering the hollow space 8 by the helically extending ridge 110, as the gas stream passes through the inlet tube. The supply of gas entering the hollow space 8 is graded due to the gradual increase in the proportion of the inlet tube that is open towards its downstream end.

From the hollow space 8, the gas flows generally radially outwardly through the filter medium of the wall 2. Any liquid in the gas stream will be coalesced by the filtration layer 10 and any coalesced liquid will be carried to the drainage layer 12 by the flow of gas, where the liquid will be retained. The liquid will tend to drain to the bottom of the drainage layer 12, where it can tend to accumulate in the part of the drainage layer 12 folded under the bottom surface 12, thereby forming a wet band. When that part of the drainage layer 12 becomes sufficiently saturated, the liquid will begin to drain from any exposed parts of that part of the drainage layer, generally in the form of drops. The compression of the drainage layer 12 by the fins 96 will tend to encourage the drainage of liquid from the drainage layer along the fins.

Filtered gas exiting the filter element enters the annular space 64 between the filter element and the housing. Filtered gas is then discharged from the filter assembly through the outlet port 58 in the housing head 52, which is in fluid communication with the annular space 64. Gas flowing from the annular space 64 to the outlet port 58 is directed around the internal cylindrical wall 72 of the housing head 52, and toward the outlet port, by the tapered rib 91 that is located directly underneath the cylindrical side wall.

What is claimed is:

1. A filter assembly for removing material that is entrained in a gas stream, which comprises:
    a. a housing which comprises head and body parts, with an inlet port in the head part for a gas stream to flow into the housing, the head and body parts having formations which enable them to be connected to one another and separated by relative rotation,
    b. a filter element which can be fitted within the housing, comprising a wall of a filtration medium which defines a hollow space for a gas stream to flow from the space through the wall to be filtered, and an end cap with an inlet which can be sealed to the inlet port in the head part of the housing to provide a flow path for a gas fluid stream to be supplied from the inlet port in the housing to the said space,
    in which the filter element fits into the body part of the housing, and in which the end cap and the body part have interengaging formations in the form of at least one rib and at least one groove, arranged so that the rib can be slid into the groove when the filter element is fitted into the body part, and so that the filter element rotates with the body part relative to the head part.

2. A filter assembly as claimed in claim 1, in which there are at least two ribs, and at least two corresponding grooves.

3. A filter assembly as claimed in claim 2, in which the ribs are approximately equally spaced apart.

4. A filter assembly as claimed in claim 1, in which the rib is provided on the end cap of the filter element and the groove into which the rib can slide is provided on the body part of the housing.

5. A filter assembly as claimed in claim 1, in which the inlet on the end cap of the filter element has a compressible O-ring seal for forming a fluid tight seal to the inlet port in the head part of the housing.

6. A filter assembly as claimed in claim 1, in which the inlet on the end cap of the filter element is provided by a flow conduit which extends into the head part of the housing when the assembly is assembled.

7. A filter assembly as claimed in claim 6, in which the flow conduit has a compressible O-ring seal for forming a fluid tight seal with the head part of the housing.

8. A filter assembly as claimed in claim 1, in which at least one of the rib and the groove is tapered so that the security of the engagement of the rib in the groove against rotation of the filter element relative to the housing base part is increased by increasing the depth to which the rib is received in the groove.

9. A filter assembly as claimed in claim 1, in which the leading edge of the rib is rounded and the trailing edge of the rib tapers inwardly towards a sharp point or edge.

10. A filter assembly as claimed in claim 1, in which the rib is arranged within the assembly so that it causes a change in the direction of flow of gas which flows over it, towards the gas outlet from the assembly.

11. A filter assembly as claimed in claim 1, in which the rib flares outwardly from the leading edge towards the trailing edge, in order to direct the flow of the gas fluid stream past an obstruction between the rib and the gas outlet from the assembly.

12. A filter assembly as claimed in claim 11, in which the rib is approximately V-shaped when viewed in cross-section, perpendicular to the axis of the assembly.

13. A filter assembly as claimed in claim 12, in which the V-shaped rib has a flat top surface.

14. A filter assembly as claimed in claim 1, in which the body part of the housing fits within with the head part of the housing where they are connected to one another.

15. A filter assembly as claimed in claim 1, in which the formations on the head and body parts of the housing are cooperating screw threads so that as the head and body are rotated relative to each other they are caused to move axially relative to each other.

16. A filter assembly as claimed in claim 1, wherein the filter element includes a drainage medium which surrounds the filtration medium, and which can retain liquid that has been coalesced by the filtration medium.

17. A filter element for collecting material that is entrained in a gas stream, which has a wall of a filtration medium which defines a hollow space within it so that a gas stream can flow through the wall to be filtered, the element including first and second ends, with an end cap at the first end with an inlet for a gas stream to be supplied to the space within the wall, in which the end cap has a formation in the form of at least one rib or one groove, arranged so that the rib or groove can cooperate with a groove or rib respectively provided in a body part of a filter assembly when the filter element is fitted into the body part, and so that the filter element rotates with the body part relative to a head part of the filter assembly, wherein the rib is tapered from a broader, trailing end located closer to the first end of the element to a narrower, leading end, located closer to the second end of the element.

18. A filter element as claimed in claim 17, in which the rib can be slid into the groove, when the filter element is fitted into the body part.

19. A filter element as in claim 17, in which the rib is approximately V-shaped when viewed in cross-section, perpendicular to the axis of the assembly.

20. A filter element as in claim 19, in which the V-shaped rib has a flat end surface.

21. A filter element as in claim 20, wherein the flat end surface of the rib is flush with a flat end surface of the end cap.

22. A filter element for collecting material entrained in a fluid stream, including a ring of filter media with first and second ends circumscribing a central longitudinal axis and defining a central cavity, the element including an end cap at the first end with an opening for a fluid stream communicating with the central cavity, wherein the end cap has a formation in the form of a rib arranged around the periphery of the end cap so that the rib can cooperate with a groove provided in a body part of a filter assembly when the filter element is fitted into the body part, and so that the filter element rotates with the body part relative to a head part of the filter assembly when the body part and head part are assembled together, wherein the first rib is tapered from a rounded leading edge located closer to the second end of the element to a sharp trailing point or edge located closer to the first end of the element.

23. A filter element for collecting material entrained in a fluid stream, including a ring of filter media with first and second ends circumscribing a central longitudinal axis and defining a central cavity, the element including an end cap at the first end with an opening for a fluid stream communicating with the central cavity, wherein the end cap has a formation in the form of a first rib arranged around the periphery of the end cap so that the first rib can cooperate with a groove provided in a body part of a filter assembly when the filter element is fitted into the body part, and so that the filter element rotates with the body part relative to a head part of the filter assembly when the body part and head part are assembled together, wherein the first rib is tapered from a broader, trailing end located closer to the first end of the element, to a narrower, leading end, located closer to the second end of the element in a direction parallel to the longitudinal axis of the element.

24. A filter element as in claim 23, wherein the first rib is approximately V-shaped when viewed in cross-section, perpendicular to the longitudinal axis of the assembly.

25. A filter element as in claim 23, wherein the V-shaped first rib has a flat end surface.

26. A filter element as in claim 25, wherein the flat end surface of the first rib is flush with a flat end surface of the end cap.

27. A filter element as in claim 25, and further including at least one other rib spaced around the periphery of the first end cap, apart from the first rib, having a configuration tapered from a rounded leading edge located closer to the second end of the element, to a sharp point or edge located closer to the first end of the element.

28. A filter element as in claim 23, wherein the end cap includes a curved conduit extending from the opening to a mouth, the mouth being located in a plane parallel to the longitudinal axis of the element, and opening radially outward at a location circumferentially aligned with the first rib.

* * * * *